(12) United States Patent
Baity et al.

(10) Patent No.: US 11,511,854 B2
(45) Date of Patent: Nov. 29, 2022

(54) VARIABLE PITCH ROTOR ASSEMBLY FOR ELECTRICALLY DRIVEN VECTORED THRUST AIRCRAFT APPLICATIONS

(71) Applicant: Textron Systems Corporation, Hunt Valley, MD (US)

(72) Inventors: Sean Marshall Baity, Westminster, MD (US); David D. Billingsley, Seven Valleys, PA (US); Brad S. Galloway, Seven Valleys, PA (US); Richard M. Chapman, Madison, WI (US); Daniel Thomas Otradovec, Forest Hill, MD (US); Graham Schill, Upperco, MD (US)

(73) Assignee: Textron Systems Corporation, Hunt Valley, MD (US)

( * ) Notice: Subject to any disclaimer, the term of this patent is extended or adjusted under 35 U.S.C. 154(b) by 748 days.

(21) Appl. No.: 16/395,415

(22) Filed: Apr. 26, 2019

(65) Prior Publication Data

US 2019/0329882 A1     Oct. 31, 2019

Related U.S. Application Data

(60) Provisional application No. 62/663,415, filed on Apr. 27, 2018.

(51) Int. Cl.
*B64C 29/00*     (2006.01)
*B64C 27/08*     (2006.01)
*B64C 27/26*     (2006.01)

(52) U.S. Cl.
CPC .......... *B64C 29/0033* (2013.01); *B64C 27/08* (2013.01); *B64C 27/26* (2013.01);
(Continued)

(58) Field of Classification Search
CPC ..... B64C 29/0033; B64C 27/08; B64C 27/26; B64C 2201/024; B64C 2201/028;
(Continued)

(56) References Cited

U.S. PATENT DOCUMENTS

| 2,054,810 | A | * | 9/1936 | Gaba ........................ B64C 11/32 |
| | | | | 416/165 |
| 2,474,635 | A | * | 6/1949 | Nichols ..................... B63H 3/04 |
| | | | | 416/61 |

(Continued)

FOREIGN PATENT DOCUMENTS

| WO | 20140045276 | 3/2014 |
| WO | 20180045253 | 3/2018 |

*Primary Examiner* — Medhat Badawi
(74) *Attorney, Agent, or Firm* — BainwoodHuang

(57) ABSTRACT

An aircraft employs articulated, variable-position electric rotors having different operating configurations and transitions therebetween, as well as variable-pitch airfoils or blades, for generating vectored thrust in the different configurations. Control circuitry generates rotor position signals and blade pitch signals to independently control rotor thrust, rotor orientation and rotor blade pitch of the variable-position rotors in a manner providing (i) the transitions among the operating configurations for corresponding flight modes of the aircraft, which may include both vertical takeoff and landing (VTOL) mode as well as a forward-flight mode, and (ii) commanded thrust-vectoring maneuvering of the aircraft in the different configurations, including tailoring blade pitch to optimize aspects of aircraft performance.

13 Claims, 27 Drawing Sheets

(52) U.S. Cl.
CPC .. *B64C 2201/024* (2013.01); *B64C 2201/028* (2013.01); *B64C 2201/042* (2013.01); *B64C 2201/088* (2013.01); *B64C 2201/108* (2013.01); *B64C 2201/165* (2013.01)

(58) Field of Classification Search
CPC ........ B64C 2201/042; B64C 2201/088; B64C 2201/108; B64C 2201/165; B64C 2201/021; B64C 2201/104; B64C 39/024
See application file for complete search history.

(56) References Cited

U.S. PATENT DOCUMENTS

| | | | | |
|---|---|---|---|---|
| 2,664,958 | A * | 1/1954 | Dancik | B64C 27/30 74/483 R |
| D178,598 | S * | 8/1956 | Fletcher | D12/335 |
| 3,181,810 | A * | 5/1965 | Olson | B64C 29/0033 244/66 |
| 3,246,861 | A * | 4/1966 | Curci | B64C 29/0033 244/17.23 |
| 4,222,234 | A * | 9/1980 | Adamson | B64C 29/0066 244/54 |
| 4,437,630 | A * | 3/1984 | Jefferies | B64D 1/18 239/171 |
| 5,823,468 | A * | 10/1998 | Bothe | B64B 1/34 244/209 |
| 5,941,478 | A * | 8/1999 | Schmittle | B64C 1/00 244/131 |
| 6,293,491 | B1 * | 9/2001 | Wobben | B64D 27/24 244/17.23 |
| 6,607,161 | B1 * | 8/2003 | Krysinski | B64C 29/0033 244/7 C |
| 6,616,095 | B2 * | 9/2003 | Stamps | B64C 27/37 416/114 |
| 7,032,861 | B2 * | 4/2006 | Sanders, Jr. | B64C 27/20 244/12.1 |
| 7,249,732 | B2 | 7/2007 | Sanders, Jr. et al. | |
| 7,267,300 | B2 * | 9/2007 | Heath | B64D 35/04 244/12.3 |
| 7,398,946 | B1 * | 7/2008 | Marshall | B60L 53/12 244/12.3 |
| 7,472,863 | B2 * | 1/2009 | Pak | B64D 35/04 244/12.5 |
| 7,607,606 | B2 * | 10/2009 | Milde, Jr. | B64C 29/0025 244/12.3 |
| 7,654,486 | B2 * | 2/2010 | Milde, Jr. | B64C 27/20 244/12.3 |
| 7,699,260 | B2 * | 4/2010 | Hughey | B64C 27/08 244/17.11 |
| 7,717,368 | B2 * | 5/2010 | Yoeli | B64C 27/08 244/17.11 |
| 7,789,342 | B2 * | 9/2010 | Yoeli | B64C 29/0025 244/12.3 |
| 8,128,033 | B2 * | 3/2012 | Raposo | B63G 8/08 244/171.2 |
| 8,695,919 | B2 * | 4/2014 | Shachor | B64C 29/04 244/17.11 |
| 8,874,360 | B2 * | 10/2014 | Klinger | G05D 1/0027 701/25 |
| 8,931,729 | B2 * | 1/2015 | Abde Qader Alzu'bi | B64C 27/20 244/17.23 |
| 9,045,226 | B2 * | 6/2015 | Piasecki | B64C 27/32 |
| 9,096,314 | B2 * | 8/2015 | Brotherton-Ratcliffe | B64D 27/10 |
| 9,120,560 | B1 * | 9/2015 | Armer | B64C 29/0025 |
| 9,187,174 | B2 * | 11/2015 | Shaw | B64C 29/0033 |
| 9,266,610 | B2 * | 2/2016 | Knapp | G05D 1/0055 |
| 9,284,058 | B2 * | 3/2016 | Wang | B64D 27/24 |
| 9,340,301 | B2 * | 5/2016 | Dickson | B64C 39/024 |
| 9,409,642 | B1 * | 8/2016 | Pingree | B64C 29/0025 |
| 9,446,844 | B2 * | 9/2016 | Jung | B60F 5/02 |
| 9,676,479 | B2 * | 6/2017 | Brody | B64D 35/04 |
| 9,708,059 | B2 * | 7/2017 | Logan | B64C 39/005 |
| 9,856,018 | B2 * | 1/2018 | King | B64C 29/0025 |
| 9,889,930 | B2 * | 2/2018 | Welsh | B64C 39/024 |
| 9,902,489 | B2 * | 2/2018 | Fisher | B64C 5/02 |
| 9,902,493 | B2 * | 2/2018 | Simon | B64C 27/10 |
| D816,547 | S * | 5/2018 | Cui | D12/16.1 |
| D822,579 | S * | 7/2018 | Lienhard | D12/328 |
| 10,046,853 | B2 * | 8/2018 | Vander Mey | B64C 27/08 |
| 10,053,213 | B1 * | 8/2018 | Tu | B64C 39/024 |
| 10,081,436 | B1 * | 9/2018 | Tian | B64C 29/0025 |
| D832,154 | S * | 10/2018 | Tian | D12/161 |
| 10,131,426 | B2 * | 11/2018 | Judas | B64C 39/08 |
| 10,137,982 | B1 * | 11/2018 | Dormiani | B64C 27/26 |
| 10,183,746 | B2 * | 1/2019 | McCullough | B64D 25/12 |
| 10,214,285 | B2 * | 2/2019 | McCullough | B64D 1/08 |
| D843,306 | S * | 3/2019 | Tzarnotzky | D12/329 |
| D843,919 | S * | 3/2019 | Tzarnotzky | D12/329 |
| 10,227,133 | B2 * | 3/2019 | McCullough | B64D 17/80 |
| 10,232,950 | B2 * | 3/2019 | McCullough | B64D 31/10 |
| 10,239,615 | B2 * | 3/2019 | Duru | B64C 27/20 |
| 10,252,796 | B2 * | 4/2019 | Reichert | B64C 29/0033 |
| 10,293,932 | B2 * | 5/2019 | Alzahrani | B64C 25/22 |
| 10,294,948 | B2 * | 5/2019 | Alvini | F04D 19/002 |
| 10,301,016 | B1 * | 5/2019 | Bondarev | B64C 29/0033 |
| D852,092 | S * | 6/2019 | Woodworth | D12/16.1 |
| 10,315,761 | B2 * | 6/2019 | McCullough | B64C 29/0033 |
| 10,317,914 | B2 * | 6/2019 | Douglas | B64C 29/0008 |
| 10,322,799 | B2 * | 6/2019 | McCullough | B64C 27/30 |
| 10,329,014 | B2 * | 6/2019 | McCullough | B64C 3/32 |
| 10,336,443 | B2 * | 7/2019 | Louis | B64C 27/30 |
| 10,351,232 | B2 * | 7/2019 | McCullough | B64C 29/0033 |
| 10,364,036 | B2 * | 7/2019 | Tighe | B64D 29/02 |
| D856,898 | S * | 8/2019 | Evulet | D12/335 |
| D856,899 | S * | 8/2019 | Evulet | D12/335 |
| 10,399,673 | B1 * | 9/2019 | Roop | B64C 3/30 |
| 10,435,169 | B2 * | 10/2019 | Steinwandel | B64D 27/24 |
| 10,442,522 | B2 * | 10/2019 | Oldroyd | B64C 29/02 |
| 10,464,620 | B2 * | 11/2019 | Arigoni | G05D 1/027 |
| D868,627 | S * | 12/2019 | Evulet | D12/319 |
| D868,668 | S * | 12/2019 | Parvizian | D12/328 |
| 10,501,193 | B2 * | 12/2019 | Oldroyd | B64D 27/06 |
| 10,518,595 | B2 * | 12/2019 | Dietrich | B64D 35/02 |
| D872,004 | S * | 1/2020 | Nunes | D12/328 |
| D872,681 | S * | 1/2020 | Tzarnotzky | D12/329 |
| D873,202 | S * | 1/2020 | Tzarnotzky | D12/329 |
| 10,525,832 | B2 * | 1/2020 | Zhao | B60L 53/80 |
| 10,526,065 | B2 * | 1/2020 | Thomassey | B64C 3/56 |
| D875,021 | S * | 2/2020 | Nunes | D12/326 |
| D875,023 | S * | 2/2020 | Lee | D12/328 |
| D875,840 | S * | 2/2020 | Wu | D21/447 |
| D876,988 | S * | 3/2020 | Stepura | D12/16.1 |
| 10,597,153 | B1 * | 3/2020 | Schuller | B60L 50/52 |
| 10,597,164 | B2 * | 3/2020 | Oldroyd | B64C 29/02 |
| 10,604,249 | B2 * | 3/2020 | McCullough | B64C 29/00 |
| D881,106 | S * | 4/2020 | Parvizian | D12/319 |
| D881,107 | S * | 4/2020 | Parvizian | D12/319 |
| 10,618,646 | B2 * | 4/2020 | McCullough | B64C 27/52 |
| 10,618,647 | B2 * | 4/2020 | McCullough | B64C 39/02 |
| 10,625,853 | B2 * | 4/2020 | McCullough | B64C 27/26 |
| 10,633,087 | B2 * | 4/2020 | McCullough | G05D 1/102 |
| 10,633,088 | B2 * | 4/2020 | McCullough | B64C 3/56 |
| 10,640,215 | B2 * | 5/2020 | Ivans | B64D 39/06 |
| 10,661,892 | B2 * | 5/2020 | McCullough | B64C 25/04 |
| D887,950 | S * | 6/2020 | Evulet | D12/335 |
| 10,689,105 | B2 * | 6/2020 | Romo | B64C 39/08 |
| D890,074 | S * | 7/2020 | Parvizian | D12/333 |
| 10,723,433 | B2 * | 7/2020 | Woodworth | B64C 1/069 |
| 10,730,622 | B2 * | 8/2020 | Groninga | B64C 9/00 |
| 10,737,765 | B2 * | 8/2020 | Oldroyd | B64C 11/32 |
| 10,737,766 | B2 * | 8/2020 | Mores | B64C 11/46 |
| 10,737,778 | B2 * | 8/2020 | Oldroyd | B64D 27/24 |
| 10,807,707 | B1 * | 10/2020 | Ter Keurs | B64C 25/52 |
| 10,836,475 | B2 * | 11/2020 | Pfaller | B64C 29/0025 |
| 10,870,487 | B2 * | 12/2020 | McCullough | B64D 25/12 |
| 10,882,615 | B2 * | 1/2021 | Bhat | B64C 39/024 |
| 10,906,637 | B2 * | 2/2021 | Stamps | B64D 27/24 |
| 10,981,649 | B2 * | 4/2021 | LeGrand | B64C 27/26 |
| 10,981,661 | B2 * | 4/2021 | Oldroyd | B64D 31/06 |

(56) References Cited

U.S. PATENT DOCUMENTS

| | | | | |
|---|---|---|---|---|
| 10,988,245 B2* | 4/2021 | Rudraswamy | B64C 11/001 |
| 10,988,248 B2* | 4/2021 | Mikić | B64C 3/38 |
| 10,994,838 B2* | 5/2021 | DeLorean | B64C 27/32 |
| 11,027,837 B2* | 6/2021 | McCullough | B64D 27/24 |
| 11,034,445 B2* | 6/2021 | Woodworth | B64C 39/024 |
| 11,040,768 B2* | 6/2021 | Bailly | B64C 17/02 |
| 11,046,426 B2* | 6/2021 | Globerman | B64C 27/20 |
| 11,052,998 B2* | 7/2021 | Mores | B60L 50/60 |
| 11,091,246 B2* | 8/2021 | Shiosaki | G05D 1/0858 |
| 11,091,261 B2* | 8/2021 | Yuan | B64C 27/08 |
| 11,136,119 B2* | 10/2021 | LeGrand | B64C 11/46 |
| 11,148,791 B2* | 10/2021 | Messimore | B64D 33/06 |
| 11,148,801 B2* | 10/2021 | Evulet | B64C 5/06 |
| 11,161,596 B2* | 11/2021 | Sandberg | B64C 27/68 |
| 11,161,605 B2* | 11/2021 | Katayama | B64C 13/00 |
| 11,174,019 B2* | 11/2021 | Moore | B64C 11/48 |
| 11,220,325 B2* | 1/2022 | Kiesewetter | B64C 27/20 |
| 11,249,477 B2* | 2/2022 | LeGrand | B64C 11/46 |
| 11,267,570 B2* | 3/2022 | Villa | B64C 9/38 |
| 11,292,593 B2* | 4/2022 | Moore | B64D 35/06 |
| 2003/0057325 A1* | 3/2003 | Carroll | F02B 75/34 244/120 |
| 2003/0066932 A1* | 4/2003 | Carroll | B64C 39/024 244/120 |
| 2003/0085319 A1* | 5/2003 | Wagner | B64C 27/20 244/12.3 |
| 2003/0094537 A1* | 5/2003 | Austen-Brown | B64C 29/0033 244/7 R |
| 2004/0245374 A1* | 12/2004 | Morgan | B64C 29/0025 244/12.3 |
| 2005/0230519 A1* | 10/2005 | Hurley | B64C 29/0033 244/7 C |
| 2006/0151666 A1* | 7/2006 | VanderMey | B64C 29/0016 244/12.3 |
| 2007/0018035 A1* | 1/2007 | Saiz | B64C 39/10 244/12.3 |
| 2007/0187547 A1* | 8/2007 | Kelly | B64B 1/20 244/7 R |
| 2008/0149758 A1* | 6/2008 | Colgren | B64C 39/024 244/45 R |
| 2008/0217486 A1* | 9/2008 | Colten | B64C 39/024 244/45 R |
| 2009/0008499 A1* | 1/2009 | Shaw | B64C 27/20 244/17.23 |
| 2009/0159757 A1* | 6/2009 | Yoeli | B64C 27/20 244/23 A |
| 2010/0065677 A1* | 3/2010 | Ferrier | B64C 27/26 244/6 |
| 2011/0001020 A1* | 1/2011 | Forgac | B64C 29/0033 244/7 A |
| 2011/0049306 A1* | 3/2011 | Yoeli | B64C 29/0025 244/23 A |
| 2012/0091257 A1* | 4/2012 | Wolff | B64C 29/0033 244/12.4 |
| 2012/0119016 A1* | 5/2012 | Shaw | B64C 27/20 244/12.3 |
| 2013/0020429 A1* | 1/2013 | Kroo | B64D 31/00 244/6 |
| 2013/0062455 A1* | 3/2013 | Lugg | B64C 29/0025 244/12.3 |
| 2014/0332620 A1* | 11/2014 | Earon | B64D 47/08 244/119 |
| 2014/0339372 A1* | 11/2014 | Dekel | B64C 29/0033 244/7 R |
| 2015/0014475 A1* | 1/2015 | Taylor | B64C 29/0025 244/6 |
| 2015/0197335 A1* | 7/2015 | Dekel | G05D 1/0858 701/5 |
| 2016/0114887 A1* | 4/2016 | Zhou | G06Q 20/367 348/148 |
| 2016/0129998 A1* | 5/2016 | Welsh | B64C 27/24 244/12.3 |
| 2016/0144957 A1* | 5/2016 | Claridge | B64C 29/02 244/6 |
| 2016/0200436 A1* | 7/2016 | North | B64D 27/24 244/7 R |
| 2016/0236774 A1* | 8/2016 | Niedzballa | B64D 27/24 |
| 2016/0272296 A1* | 9/2016 | Fink | B64C 1/26 |
| 2016/0297520 A1* | 10/2016 | Sada-Salinas | B64C 29/0025 |
| 2016/0318600 A1* | 11/2016 | Wirasnik | B64C 11/04 |
| 2016/0376014 A1* | 12/2016 | Alnafisah | B64C 39/024 244/39 |
| 2017/0197725 A1* | 7/2017 | Foo | B64C 39/024 |
| 2017/0225779 A1* | 8/2017 | Gamble | B64C 27/30 |
| 2017/0248125 A1* | 8/2017 | Luchsinger | F03D 9/32 |
| 2017/0274993 A1* | 9/2017 | Beckman | B64C 11/48 |
| 2017/0297675 A1* | 10/2017 | Fink | B64C 1/069 |
| 2017/0300065 A1* | 10/2017 | Douglas | B64C 29/0025 |
| 2017/0327200 A1* | 11/2017 | Probst | B64C 27/04 |
| 2018/0001999 A1* | 1/2018 | Page | B64C 25/14 |
| 2018/0045253 A1* | 2/2018 | Sun | F16D 13/66 |
| 2018/0273158 A1* | 9/2018 | Courtin | B64C 39/024 |
| 2018/0273170 A1* | 9/2018 | D'Sa | B64C 3/32 |
| 2019/0009895 A1* | 1/2019 | Tu | B64C 29/0025 |
| 2019/0106192 A1* | 4/2019 | Woodworth | B64C 39/024 |
| 2019/0149724 A1* | 5/2019 | Wu | H04N 5/23222 348/144 |
| 2019/0168872 A1* | 6/2019 | Grubb | B64D 47/08 |
| 2019/0329882 A1* | 10/2019 | Baity | B64C 29/0033 |
| 2020/0023970 A1* | 1/2020 | Bitar | B64C 39/026 |
| 2020/0339255 A1* | 10/2020 | Yoeli | B64C 27/26 |
| 2020/0354052 A1* | 11/2020 | Chew | B64C 13/16 |
| 2021/0197965 A1* | 7/2021 | Kunz | B64C 39/04 |
| 2022/0009626 A1* | 1/2022 | Baharav | B64C 39/04 |

\* cited by examiner

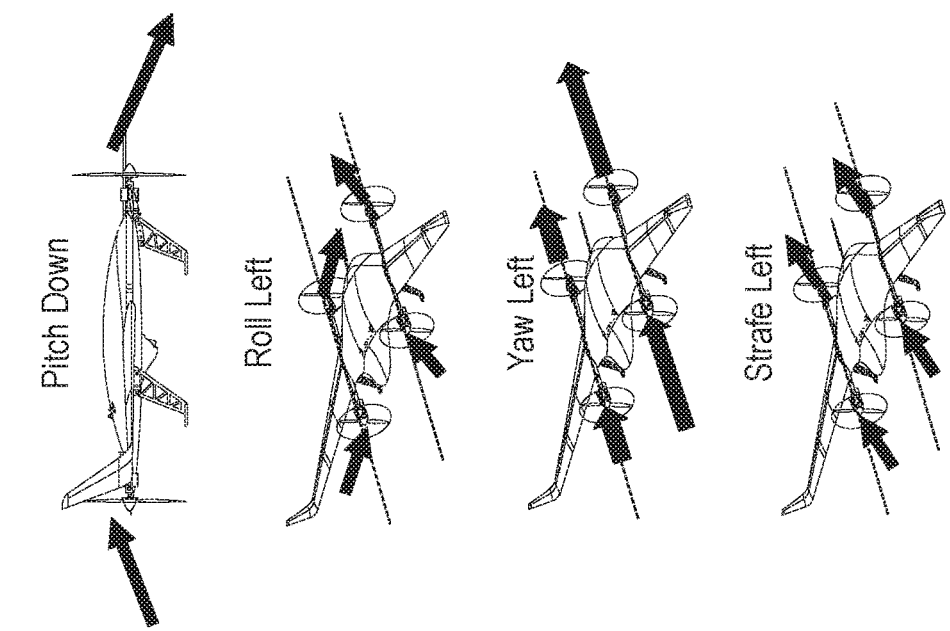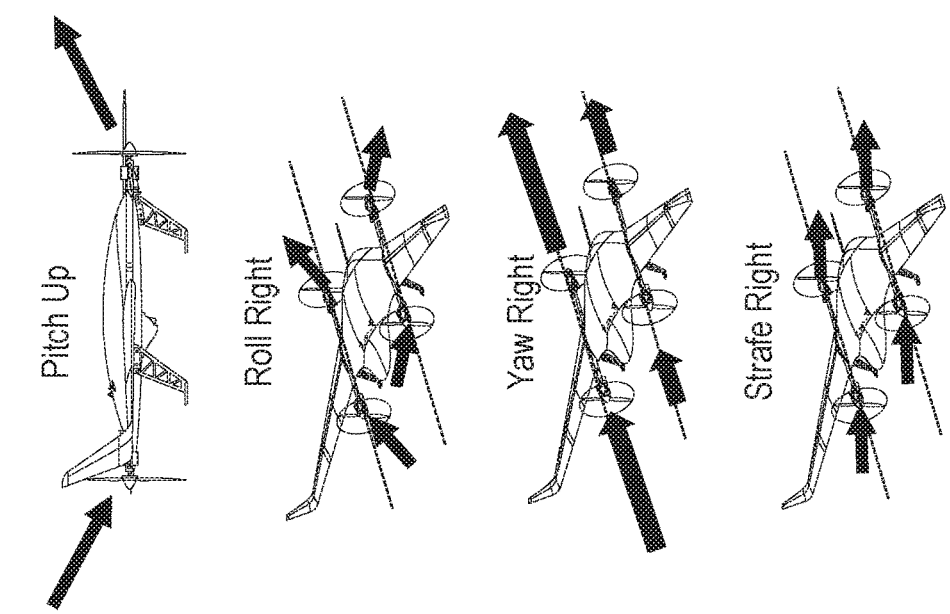
Fig. 13

Variable Position Rear Pod
Variable Position Front Pod

Semi-Fixed Position Rear Pod
Variable Position Front Pod

Fixed Position Rear Pod
Variable Position Front Pod

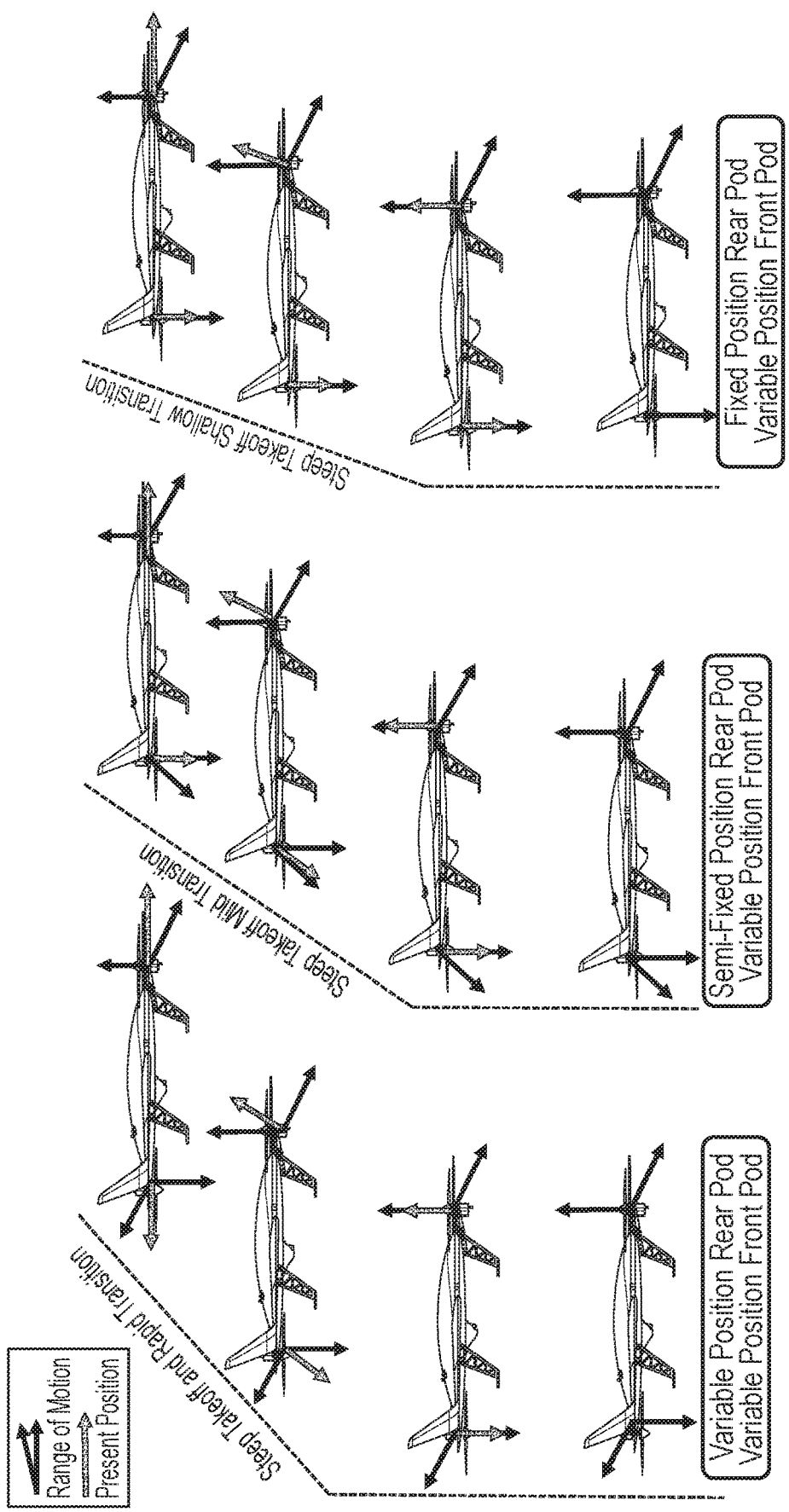

Neutral

Negative Pitch

Positive Pitch

VARIABLE PITCH ROTOR ASSEMBLY FOR ELECTRICALLY DRIVEN VECTORED THRUST AIRCRAFT APPLICATIONS

BACKGROUND

The invention relates to propulsion rotors used in aircraft systems, for example in manned or unmanned aircraft having vertical take-off and landing (VTOL) capability.

Aircraft systems are known to have certain characteristics. Example systems include the following:
1) Unmanned Small Multi-Rotor Quad-Copters ("drones")
2) Unmanned Fixed-Wing Electric
3) Unmanned Internal Combustion (IC) Engine Fixed-Wing/Rotor Craft
4) Unmanned Separated Lift/Thrust Fixed wing aircraft (Hybrid-Quad) Rotor
5) Tail-Sitters
6) Manned Single Engine Fixed-Wing Aircraft
7) Manned Rotorcraft Aircraft The above systems exhibit differences across a variety of characteristics, including cost and complexity; endurance; payload capacity; launch/recovery characteristics; energy density; scalability; presence of human operator; and others.

SUMMARY

Disclosed is a rotor assembly for use in electrically driven vectored thrust aircraft applications. The rotor assembly has rotor blade pitch control, applied to a brushless direct current motor for example, for the purposes of providing variable thrust control as part of an articulated propulsion assembly applied on an aircraft designed to operate and transition between vertical takeoff and landing (VTOL) and fixed wing operation.

The rotor assembly is disclosed in the context of an example application, which is a configurable aircraft that can fill a functional gap between consumer "drones" and Group 2 unmanned aircraft systems (UAS). In one embodiment, the aircraft is an all-electric VTOL capable UAS that maximizes capability within a sub-25 kg (55 lb) weight class, usable in applications such as precision survey and monitoring during both linear and vertical missions with a reduced unit, operating, and life-cycle cost. Generally, the aircraft may be employed in oil and gas, security, wildfire/land management, maritime security, environmental monitoring, precision survey and mapping, precision agriculture, disaster response, insurance risk management, intelligence, surveillance, and reconnaissance, and insurance claim services, for example. Other aircraft applications for the rotor assembly are possible.

More particularly, an aircraft is disclosed that includes an airframe, a plurality of articulated electric rotors attached to the airframe, a source of electrical power for powering the rotors; and control circuitry. At least some of the rotors are variable-position rotors having a plurality of operating configurations and transitions therebetween based on rotor position signals supplied thereto, the rotors generating respective magnitudes and directions of vectored thrust in respective operating configurations, the variable-position rotors being further configured for variable pitch of respective rotor blades in response to blade pitch signals supplied thereto. The control circuitry is configured and operative to generate the rotor position signals and blade pitch signals to independently control rotor thrust, rotor orientation and rotor blade pitch of each of the variable-position rotors in a manner providing (i) the transitions among the operating configurations for corresponding flight modes of the aircraft, and (ii) commanded thrust-vectoring maneuvering of the aircraft in the different configurations.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

FIG. 13 is a quasi-schematic depiction of various forward-flight maneuvers employing thrust vectoring;

FIGS. 29-31 are quasi-schematic depictions of differences of flight control and dynamics among the three configurations of FIGS. 26-28;

DETAILED DESCRIPTION

Overview

Figure 1:
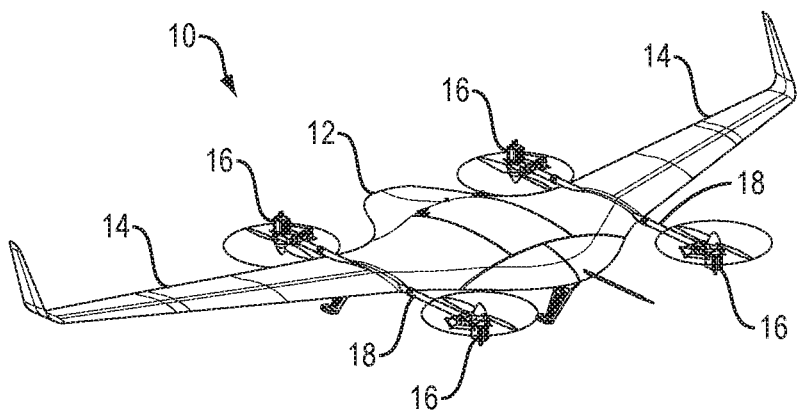
FIG. 1 is an isometric view of an aircraft.

The disclosed rotor assembly is tailored for application to small/medium sized unmanned aircraft. However, the concept can be scaled, with increasing benefit, to larger platforms, including both manned and unmanned systems. The ability to deliver variable rotor aerodynamic thrust and orientation with greater control bandwith than provided by fixed pitch systems enables the system to be constructed that yields increased aircraft maneuverability and controllability while providing thermal management benefits for electric motor driven applications.

Most multi-rotor small unmanned aircraft systems (drones) utilize distributed electric motors to derive a combination of lift, thrust, or differential angular momentum as part of propulsion and aircraft control (roll, pitch, yaw). More generally, many of today's electrical systems use brushless DC (BLDC) motors to provide propulsive power and rotor thrust control. These systems are generally electrically efficient, have a high control response bandwidth and are attached to fixed pitch rotor airfoils for applications for various aircraft modalities. However, fixed pitch rotor systems designed for multi-rotor VTOL applications are ill-suited for efficient fixed wing flight characterized by increased free-stream inlet airflow.

The disclosed rotor assembly is a multi-function device that is adapted to a BLDC to provide rotor propulsive thrust control by instantaneously controlling rotor airfoil (blade) pitch as the system rotates and provides additional heat rejection capability during motor operation.

When applied to aircraft, the variable pitch mechanism enables propeller pitch to tailor efficiency/effectiveness of the rotor for specific operating conditions. This provides greater propulsion system power efficiency, reducing the amount of fuel/battery stored onboard the aircraft so that it can be applied to greater payload capacity or increasing range/endurance. In particular, when applied to aircraft that are designed to operate in both VTOL and fixed wing regimes, the variable pitch capability enables a single prop to be well suited for efficient fixed wing flight and effective VTOL across a wide airspeed regime.

Further, the system enables variable rotor thrust to be achieved, while maintain a constant rotor tip speed. This has distinct advantages in applications where the intent is to not be audibly detected by a human observer.

Moreover, the variable pitch mechanism can be installed against the stationary (inrunner BLDC) or rotating (outrunner BLDC) element of the motor with effective thermal transfer characteristics between the components. The increased surface area and exposure to airflow increase the motor heat rejection capability. This enables the motor to achieve a lower delta temperature when energized increasing reliability, durability, and maximum power yield that would otherwise be thermally limited. This enables the aircraft designer to employ lighter weight motor systems which compose a significant fraction of overall aircraft mass. The thermal transfer of the heat rejected from the BLDC motor to the rotating prop assembly could also be used, independently or in concert with other systems, to increase the surface temperature of the rotating bladed assembly to mitigate ice build-up due to environmental conditions.

Although variable pitch and tilting pods are generally known, the disclosure relates in particular to the concept of a variable pitch applied to a small electric motor, in particular to thrust vectoring on an unmanned aircraft system, with the feature of enhancing thermal management, constant rotor speed drive, and anti-icing.

The rotor/propeller assembly includes a kinematic mechanism, applied to an electric motor, that is able to vary the instantaneous pitch of one or more propeller blades through servo controlled actuation by means of a mechanical linkage. The rotor assembly is mated to the BLDC in a manner that achieves an effective thermal transfer to the rotor assembly surface area. The resulting motor/rotor system is applied as part of a tilting pod assembly that is able to actively control the relative angle of the rotor axis of rotation to a fixed frame of reference. A plurality of these propulsion pod systems are attached to onto an aircraft, to provide thrust vectoring capability to achieve and sustain flight. A flight management system coordinates the control of each independent pod tilt angle, rotor RPM, and rotor blade pitch to yield an overall resultant aircraft state and dynamic response.

Description of Embodiments

As mentioned, the rotor assembly is disclosed in the context of an example application, which is a configurable aircraft that can fill a functional gap between consumer "drones" and Group 2 unmanned aircraft systems (UAS). In one embodiment, the aircraft is an all-electric VTOL capable UAS that maximizes capability within a sub-25 kg (55 lb) weight class, usable in applications such as precision survey and monitoring during both linear and vertical missions with a reduced unit, operating, and life-cycle cost. Other aircraft applications for the rotor assembly are possible at larger and smaller platform size and scales.

The rotor assembly is described below primarily with reference to FIGS. 39-49. This is preceded by description of example aircraft applications, with reference to FIGS. 1-38.

Figure 2:
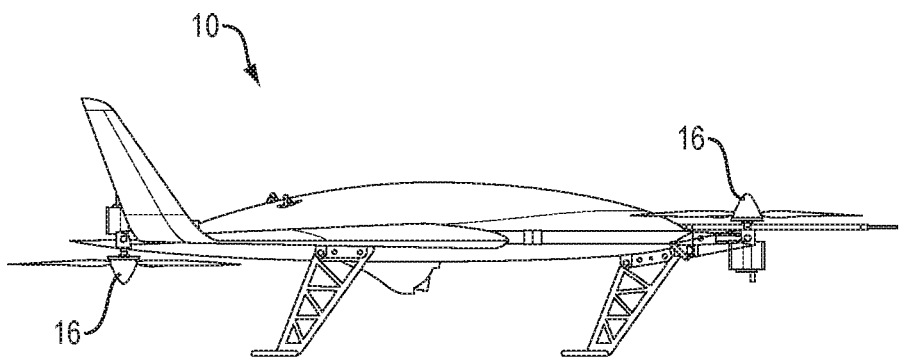
FIG. 2 is a side view of the aircraft.

FIGS. 1 and 2 show an aircraft 10 according to one embodiment. FIG. 1 is an isometric view (from top front right) and FIG. 2 is a side view.

The aircraft 10 has a central body 12 and laterally extending wing panels 14. Four motor/rotor assemblies 16 are attached at respective ends of two support booms 18, each extending longitudinally and mounted to the underside as shown. The assemblies 16 are also referred to as "rotors" and "propulsion pods" or "pods" herein. As described more below, the wing panels 14 are removable to change the operating configuration of the aircraft 10. The aircraft can be configured in two major ways: fixed wing with vertical takeoff and landing (VTOL), and VTOL quadcopter (more generally, rotorcraft), which is described more below. The central body 12 is contoured to have the shape of a flying wing, i.e., a wing-like shape capable of providing lift in a horizontal airstream. In a quad-rotor embodiment, the rotors 16 are arranged at respective corners of the central body 12. The front rotors 16 are oriented upward and the rear rotors 16 downward, and at least some of the rotors 16 are articulable or variable-position (e.g., all rotors, just forward rotors, just aft rotors). In fixed-wing operation, positional control is achieved by thrust vectoring, described more below. The aircraft 10 may be realized without conventional control surfaces such as flaps, stabilizers, etc. Omitting such control surfaces may help reduce airframe noise, which may be advantageous in certain applications. In different embodiments, a similar aircraft can be constructed with various combinations and distributions of rotor configurations and be realized with as few as two rotors. A typical arrangement includes four rotors 16 as shown; other arrangements are possible.

In the illustrated embodiment, fore/aft pairs of rotors 16 are co-linear on lines parallel to the longitudinal axis of the aircraft as shown. The opposing upward/downward rotor orientation utilizes a pusher propeller in the rear, and a tractor propeller in the front. This allows both front and rear rotors 16 to rotate 90 degrees or more and therefore provides for the retention of positive thrust through the transition between hovering or vertical flight (takeoff/landing) and forward flight. In alternative embodiments the support booms 18 may extend laterally rather than fore/aft.

The rotors 16 may incorporate integrated control surfaces as either extensions to the actuated propulsor and/or variable pitch propeller. These features can be implemented concurrently or independently to control forces imparted on the aircraft and resulting body moments. The propulsors may include variable pitch rotors for the purposes of operating with variable thrust at constant rotational speeds and/or variable-pitch propellers as shown. The rotors also may be implemented in various ways, including co-axial, counter-rotating, intermeshing rotors, ducted fans, and hub-less rotors as shown. Additionally, the tail section of the center body 12 may be articulated, tilted, morphed, to provide pitch control.

Figure 3:
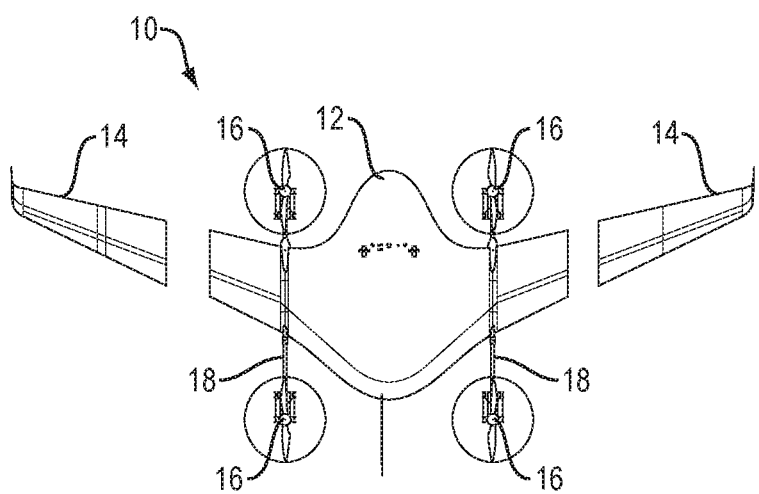
FIGS. 3-5 are views of the aircraft illustrating configurability.
Figure 4:
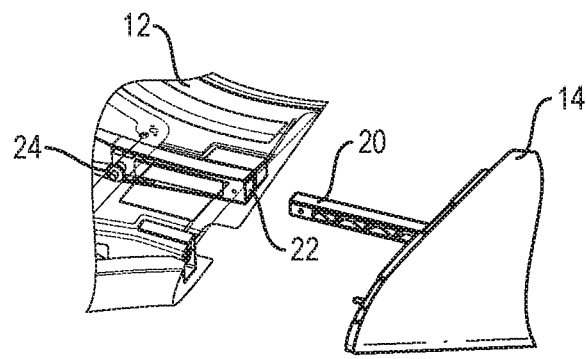
Figure 5:
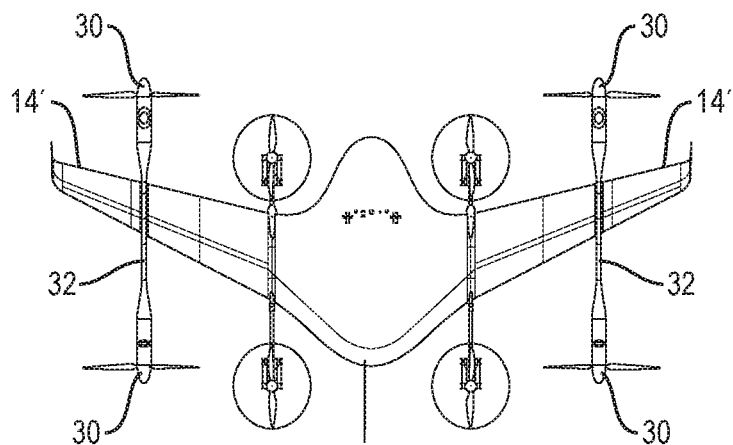

FIG. 3-5 illustrate configurability of the aircraft 10. FIG. 3 shows the aircraft 10 with the removable wing panels 14 separated from the central body 12. This is the above-mentioned rotorcraft configuration. Although the central body 12 does provide some lift in a horizontal airstream as mentioned above, the operation is essentially that of a rotorcraft, requiring significant upward thrust from the rotors to maintain altitude in horizontal flight.

FIG. 4 shows the attachment of a wing panel 14 to the central body 12. This is an example of a blind-mating interlocking spar arrangement, in which a spar 20 extends into a corresponding channel 22 of the body 12 and is retained by a quick-release pin 24 (which may be spring-loaded, for example).

FIG. 5 shows an alternative configuration in which additional rotors 30 are provided on additional booms 32 attached to the removable wing panels 14'. This configuration provides greater overall thrust and may be suitable for applications accordingly.

Figure 6:
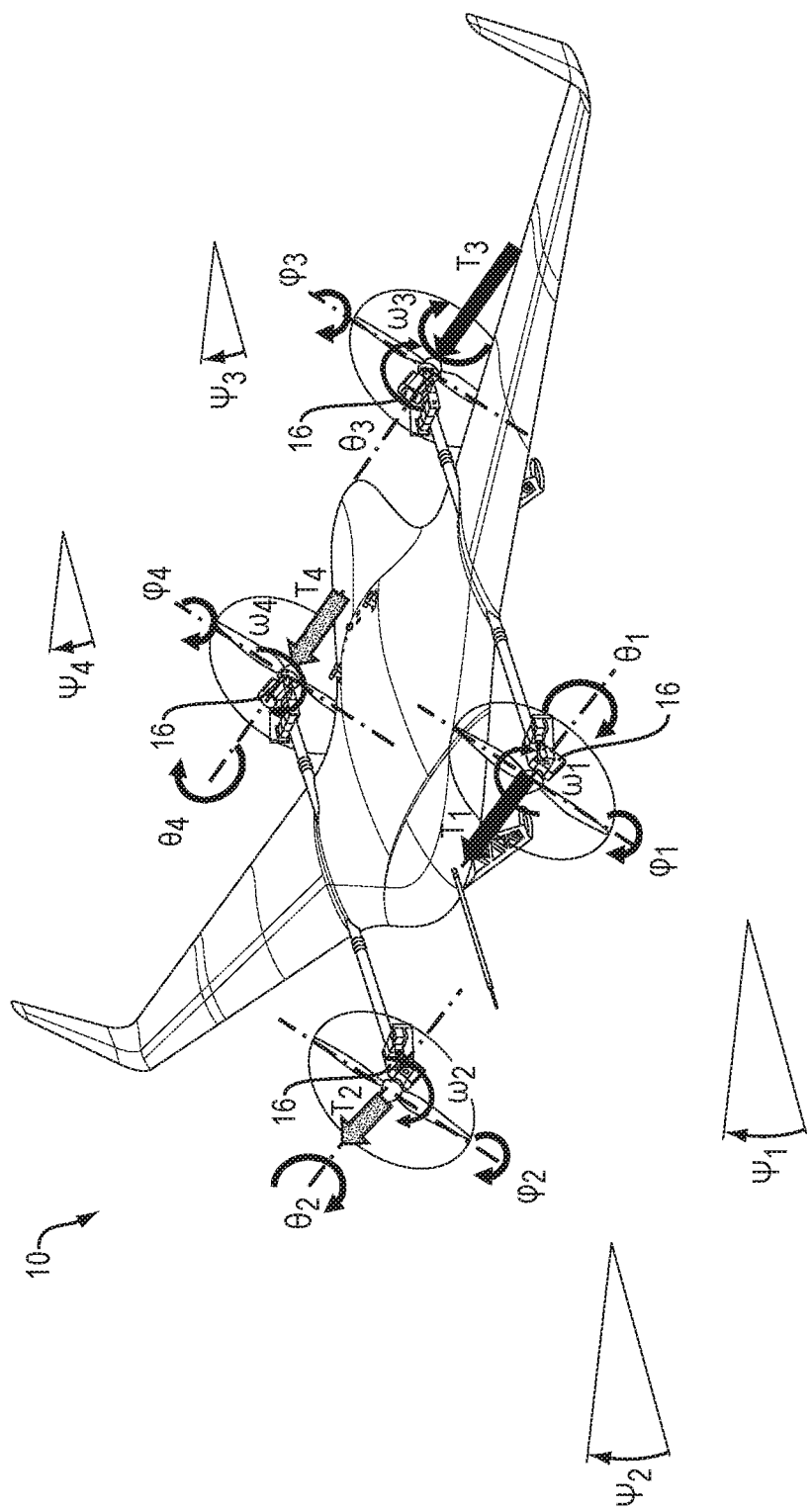
FIG. 6 is an isometric view of the aircraft illustrating thrust vectoring propulsion.

FIG. 6 illustrates the nature of thrust vectoring propulsion, with control in four dimensions—rotor assembly longitudinal tilt-angle θ, rotor assembly lateral tilt-angle ψ, rotor RPM ω, and rotor blade pitch φ. T indicates the resultant thrust vector. Numeric subscripts refer to the four separate rotors 16. In general, each of the rotors 16 may be independently controlled, although as described more below there may be configurations in which some of the rotor are either fixed or are constrained relative to others. Also this diagram assumes only single-axis tilt, but as also described more below, tilt may be provided in multiple axes, providing for even greater maneuverability.

Figure 7:
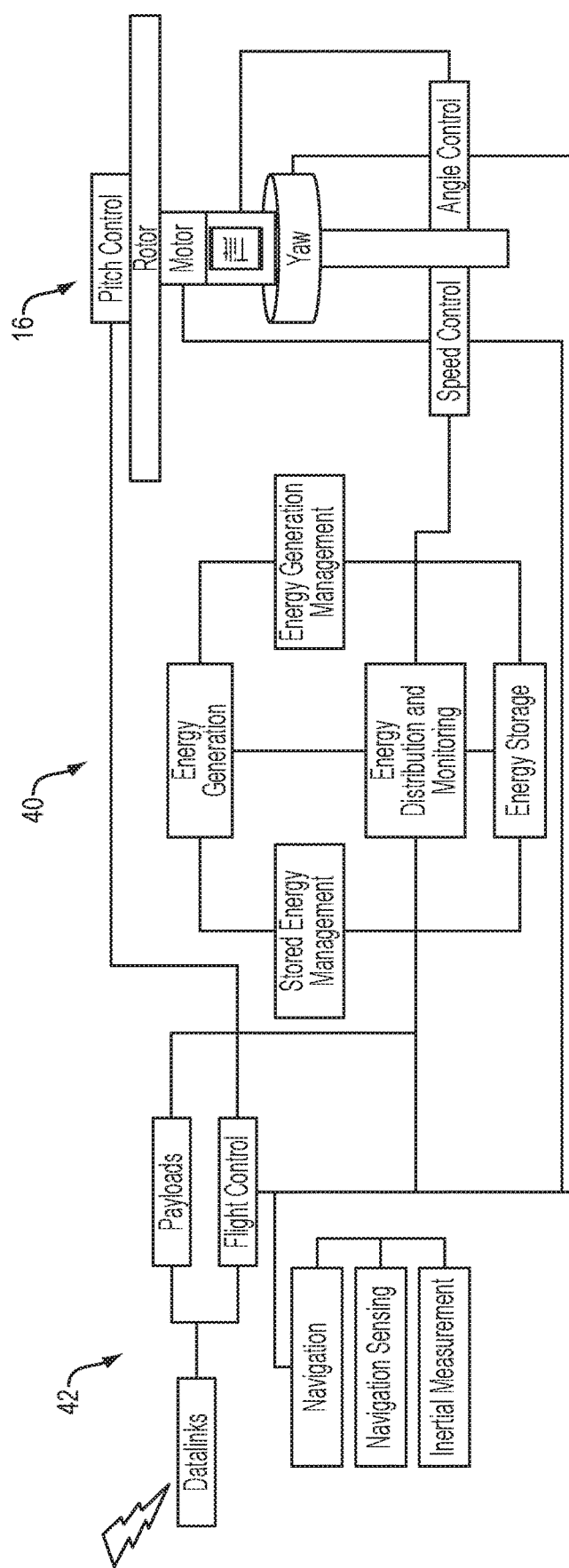
FIG. 7 is a block diagram of a flight control system.

FIG. 7 illustrates major components involved in flight control, including the following:

Energy-related components 40 including energy generation (e.g., solar panels), energy storage (e.g., batteries), energy distribution and monitoring, stored energy management, and energy generation management.

Navigation and related components 42 including datalinks for external communications, payloads, flight control, navigation, navigation sensing, and internal measurement.

Figure 8:
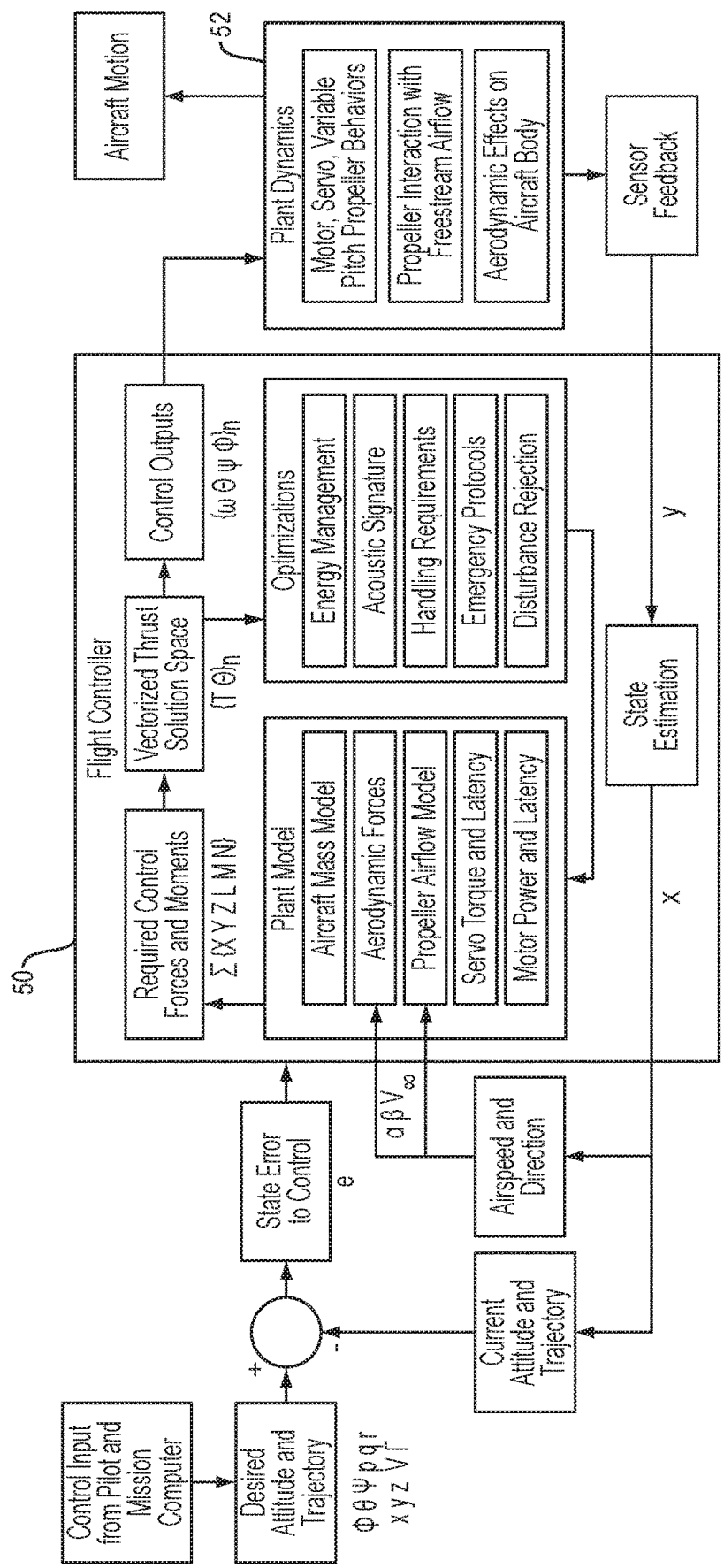
FIG. 8 is a block diagram of flight control at a detailed level.

FIG. 8 provides details of flight control as involving a computer-implemented flight controller 50 interacting with the plant dynamics 52 of the aircraft. The flight controller 50 generates control outputs including signals representing the values θ, ω, φ and ψ as mentioned above, which cause the physical aircraft 10 to interact with its environment accordingly. As shown the flight controller 50 may be realized as a model-based controller incorporating a model of the aircraft physical plant for predictive control. Sensed effects are provided to the controller 50 for state estimation and estimates of altitude and trajectory as well as airspeed and direction, which estimates are provided back to the flight controller 50 along with other inputs to update the control outputs. As mentioned, the control methodology is based on vectored thrust, in contrast to other aircraft that rely on control surfaces such as flaps, etc.

Figure 9:
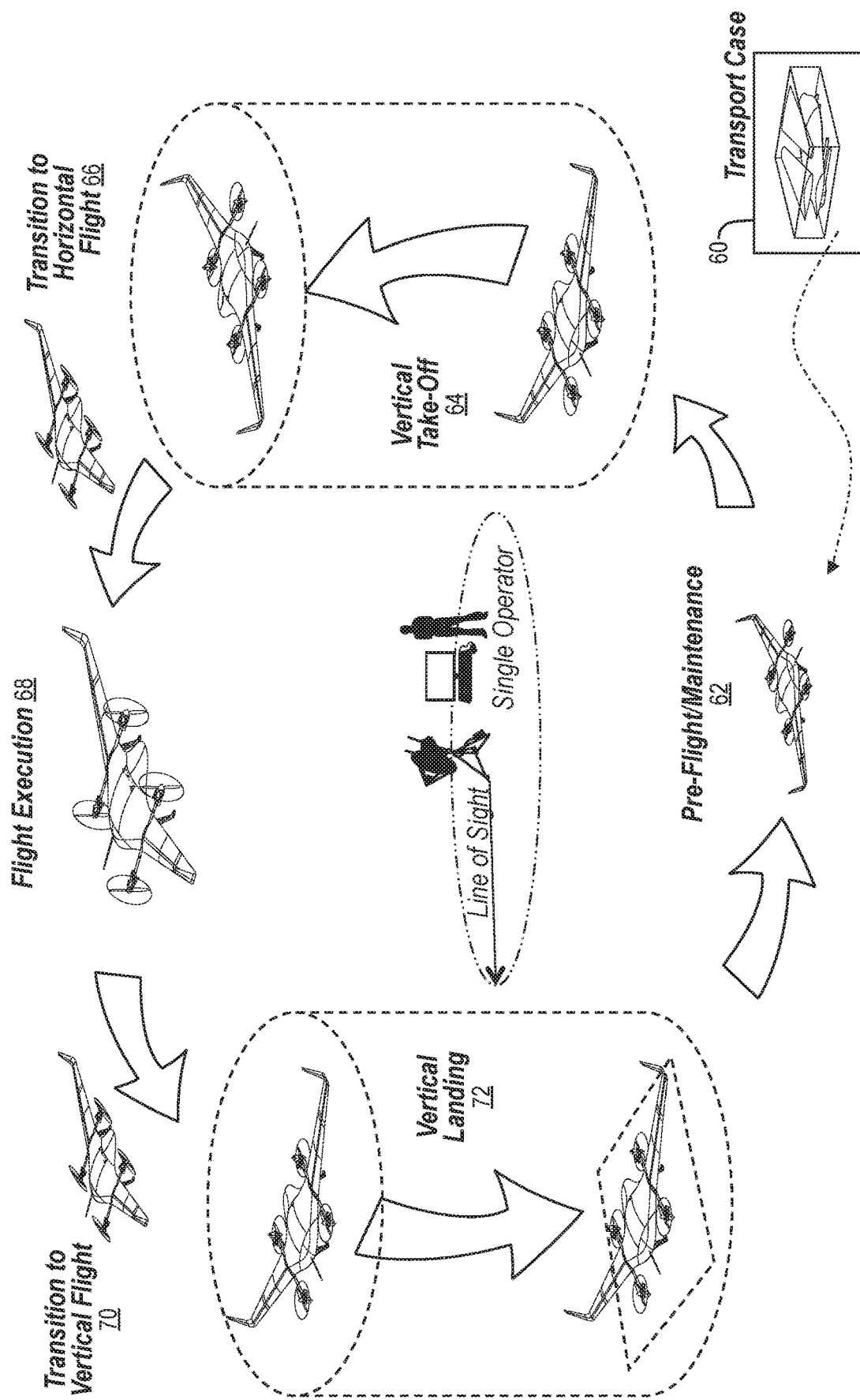
FIG. 9 is a schematic illustration of a concept of deployment of the aircraft.

FIG. 9 illustrates one concept of deployment of the aircraft 10, which is essentially that of a fixed-flight mission employing VTOL with attendant enhanced operational flexibility. Beginning with transport 60 and any pre-flight maintenance 62, operation proceeds to vertical take-off 64, transition to horizontal flight 66, flight execution 68, transition back to vertical flight 70, and vertical landing 72. This may be followed by post-flight maintenance, and then subsequent transport either for storage or a subsequent mission.

Figure 10:
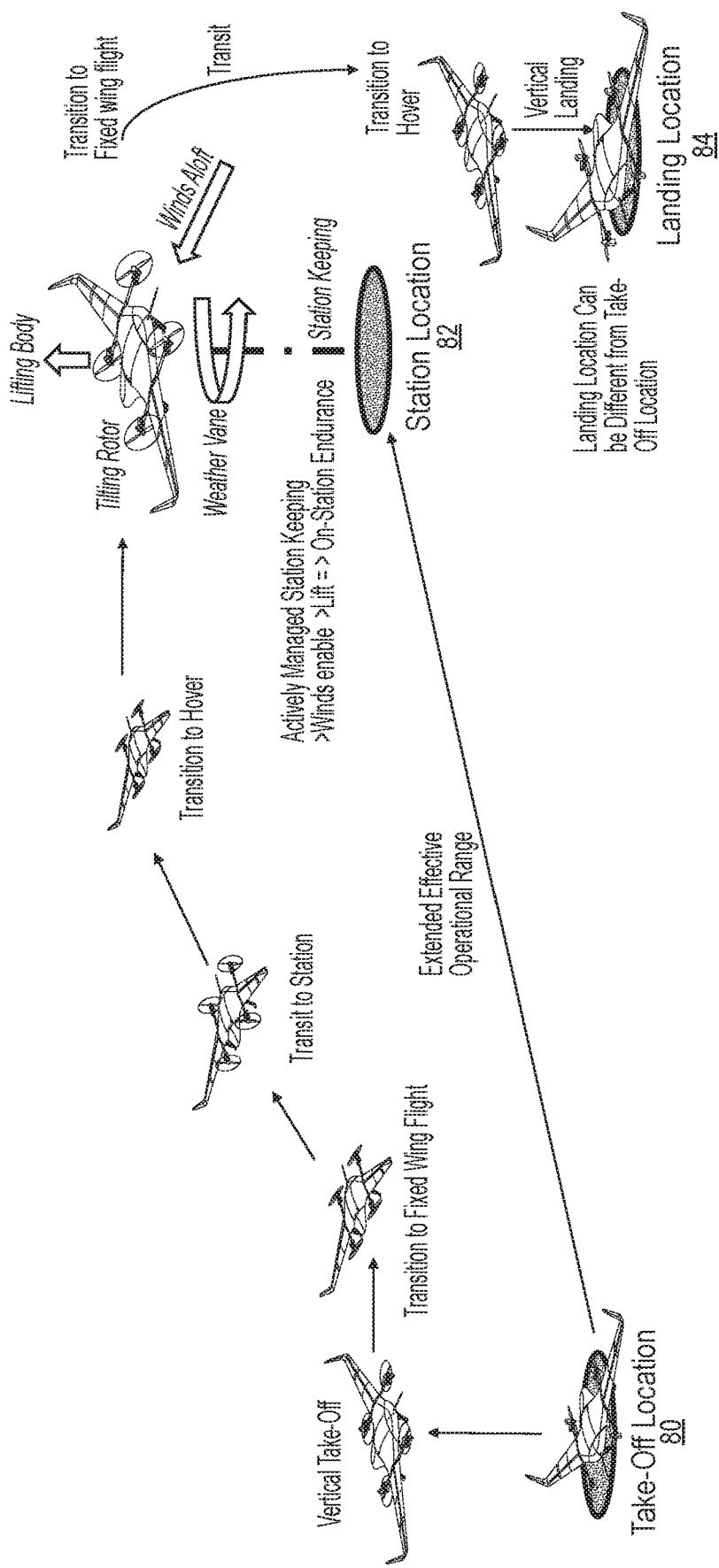
FIG. 10 is a schematic illustration of another concept of deployment of the aircraft.

FIG. 10 illustrates another concept of deployment of the aircraft 10, which is referred to as "station keeping"—a mission in which the aircraft 10 hovers for an extended period over a single location. Operation progresses from VTOL take-off from a take-off location 80, transition to fixed-wing flight and transit to station location 82, transition to hover or station keeping at the station location 82, then subsequent transition back to fixed-wing flight, transit to a landing location 84, and VTOL landing.

One advantage of the aircraft 10 is the ability of the wing-like central body 12 to provide lift in an airstream. The endurance of the aircraft in a station-keeping mission may be greater when deployed with winds aloft, in contrast to a conventional rotorcraft whose endurance generally decreases when deployed for station-keeping with winds aloft.

Figure 11:
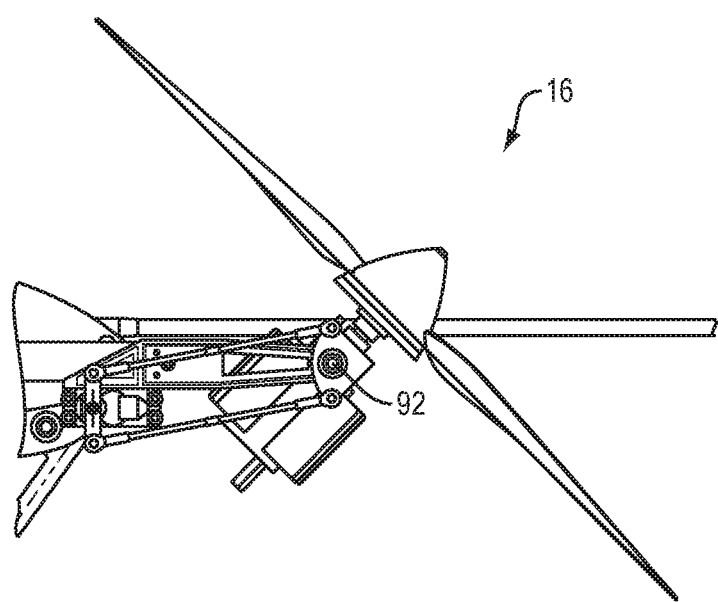
FIGS. 11-12 are illustration of rotors and their articulation.
Figure 12:
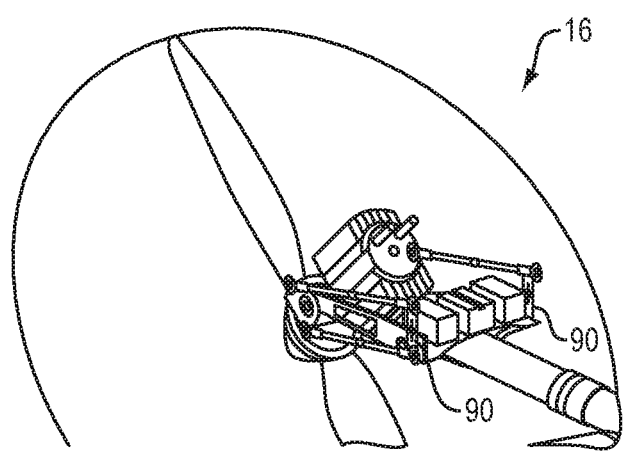

FIGS. 11-12 illustrate the rotors 16 and their articulation in additional detail. This arrangement employs parallel tandem servo control, i.e., two separate servo mechanisms 90 are arranged in parallel as best seen in FIG. 12. In this arrangement the axis of rotation 92 extends through the center of gravity of the rotor 16, as best seen in FIG. 11. Alternative mechanisms may be employed such as direct on-axis servo(s), series-tandem servos, non-center-of-gravity rotation, pneumatic or hydraulic mechanisms, belt- or gear-driven arrangements, etc. As noted above, variable positioning may be limited to one axis or may be multi-axis, e.g. tilt/yaw.

FIG. 13 illustrates various forward-flight maneuvers, all of which employ thrust vectoring except for the pure yaw movements (yaw right, yaw left) which can be performed using only thrust differentials (different thrusts applied to the rotors 16 on different sides of the aircraft). The required thrust vectors are shown schematically. Thus for pitching up, for example, the front rotors apply higher thrust upwardly while the rear rotors thrust downwardly.

Figure 14:
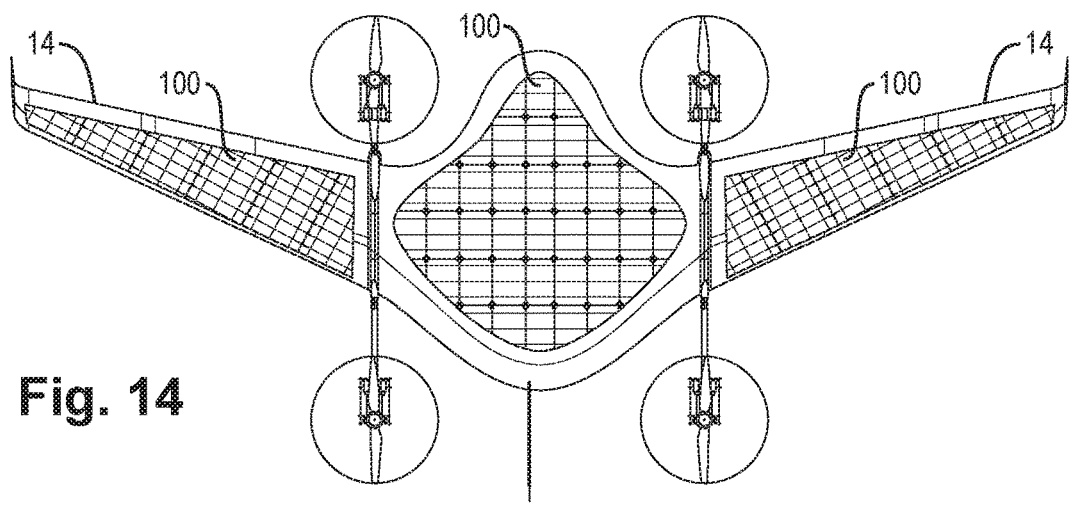
FIG. 14 is a top view of an aircraft employing photovoltaic solar panels.

FIG. 14 illustrates the use of photovoltaic solar panels 100 on the surface of the aircraft 100 for providing electrical power for operation. This approach leverages the aircraft surface area for collection potential. It may be possible to modularize the panels 100 on the wing panels 14. Internally, the aircraft 10 may employ other energy components including batteries and/or conversion technologies such as generators using internal combustion, Otto/diesel cycles, turbines (combustion gas or compressed gas), fuel cells (e.g., hydrogen or propane), or a constant energy source such as nuclear.

Generally, the individual propulsion pods can have one or more degrees of freedom to rotate relative to the airframe/lifting surface/body. The axis of articulation can be decoupled or coupled to achieve a swept range of end effect motion.

Figure 25:
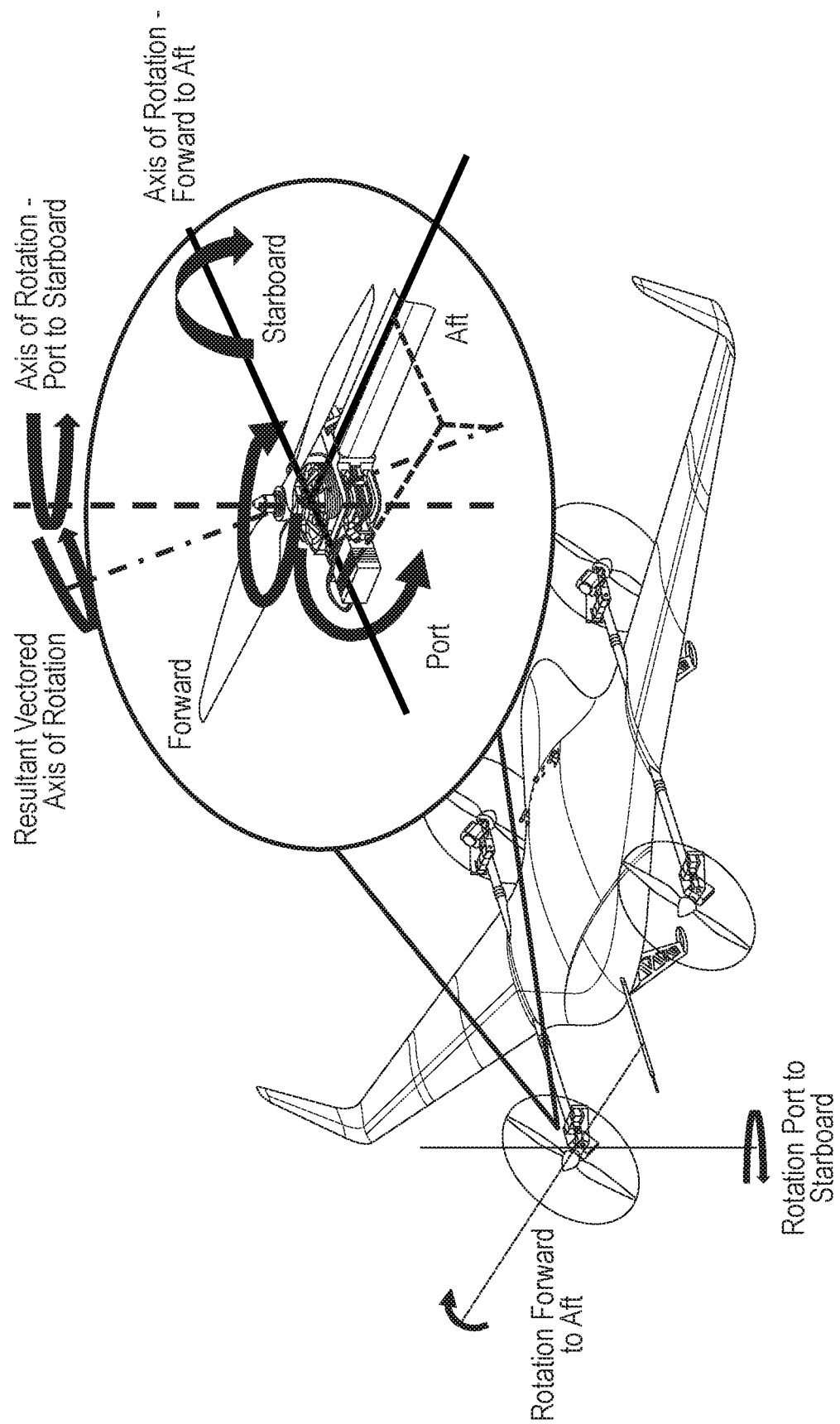
FIG. 25 is an isometric view showing detail regarding two-dimensional rotor articulation.

FIG. 25 shows additional detail regarding the two-dimensional articulation, with (1) rotation forward-to-aft (tilt) and (2) rotation port-to-starboard (yaw).

Figure 23:
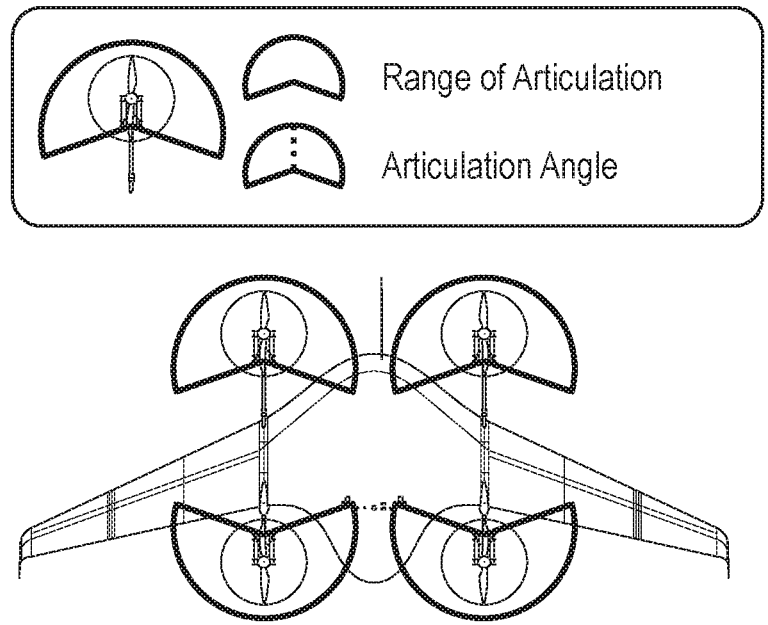
FIGS. 23-24 are quasi-schematic depictions (top view and side view respectively) of ranges of rotor articulation.
Figure 24:
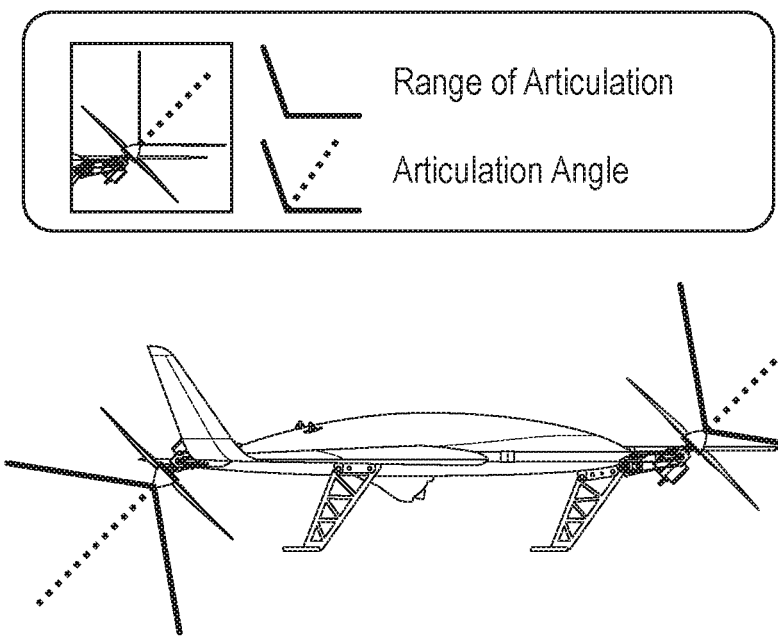
Figure 26:
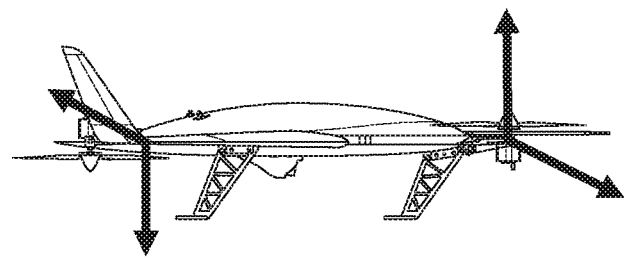
FIGS. 26-28 are side views of aircraft with different propulsion configurations.
Figure 27:
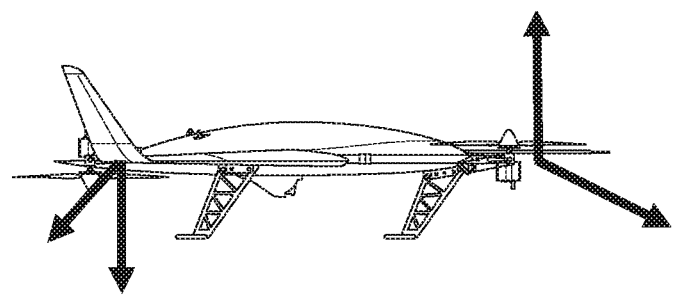
Figure 28:
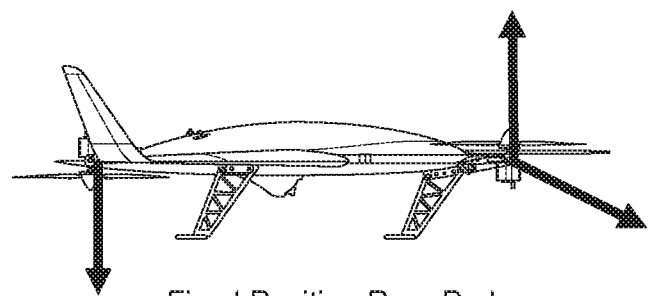

FIGS. 26-28 show examples of different propulsion configurations as briefly mentioned above. FIG. 26 is a symmetric configuration having variable position front pod (rotor) and variable position rear pod, where "position" refers to angular articulation such as shown in FIGS. 23-24. FIG. 27 is an asymmetric configuration having variable position front pod and semi-fixed (limited variability) position rear pod. FIG. 28 is another asymmetric configuration having variable position front pod and fixed position rear pod.

The following table describes functional details of the different configurations of FIGS. 26-28 in different phases of flight.

| Flight Phase | FIG. 26 Symmetric | FIG. 27 Constrained Set | FIG. 28 Fixed |
|---|---|---|---|
| VTOL/Hover | All rotors with similar range of articulation/motion | Rotors allocated to either full range of articulation or designated with limited actuation capability | Pair/set is affixed to the aircraft without articulation capability supporting VTOL in a traditional multi-rotor capacity. The remaining set/pair provides thrust vectoring capability through full range of articulation capability |
| Transition | All rotors active providing lift and transition assist | All rotors active with constrained set providing lift and transition assist. | All rotors active with fixed set/pair providing only lift assist. |
| Fixed Wing | All rotors active Option to stow pair/sets of rotors | Constrained pair/set is disabled/stowed. Option to activate with specific maneuver assist such as aggressive climb or evasive maneuvers. | Fixed pair/set disabled/stowed. |

Figure 15:
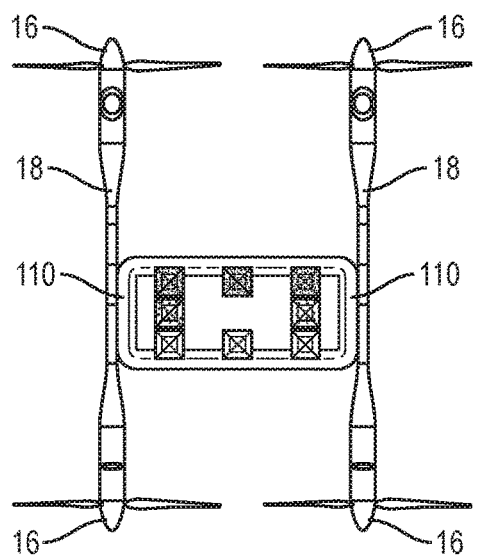
FIGS. 15 and 16 are schematic illustrations of modular components that may be used in connection with other airframe types.
Figure 16:
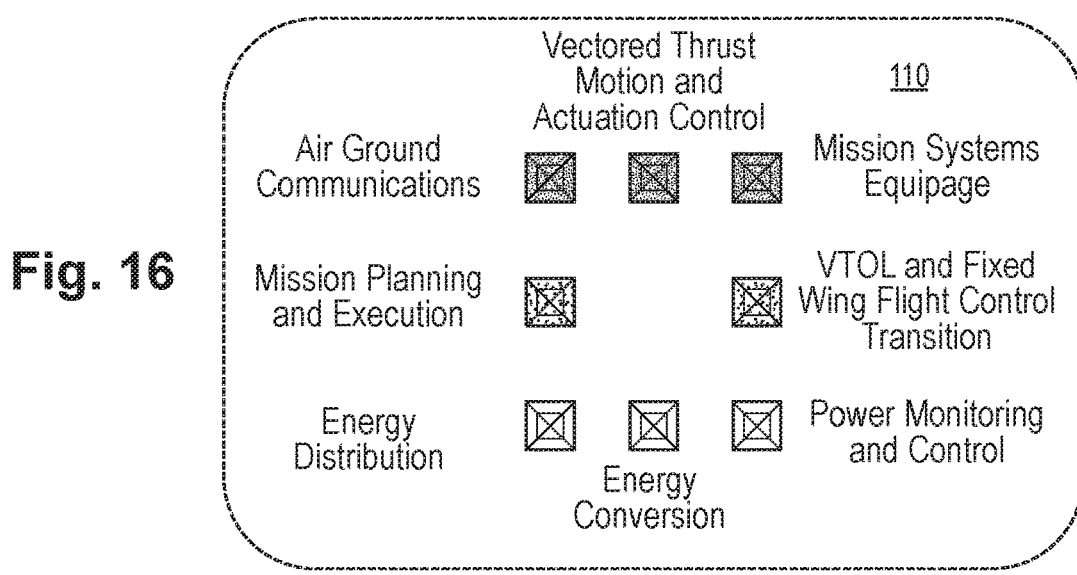

FIGS. 15 and 16 illustrate certain modularity of system components that can enable use of the general thrust-vectoring approach on a variety of different aircraft types as described more below. The propulsion system inclusive of the rotors 16 with associated actuators and components of the vectored thrust motion and actuation control system 110 (including energy storage, energy distribution, and other components as shown) can be adapted to other airframe types, including retrofitting of existing fixed wing systems.

Figure 17:
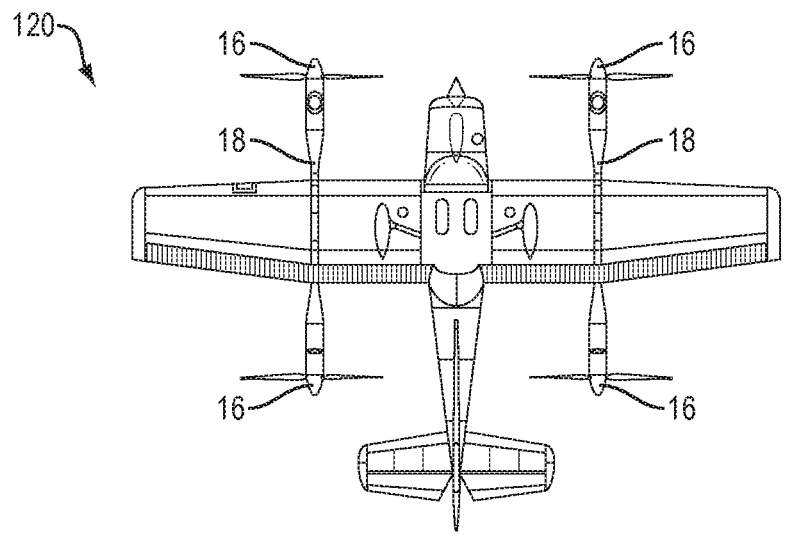
FIGS. 17-19 are top, front and side views respectively of a first aircraft of another airframe type employing the modular components.
Figure 18:
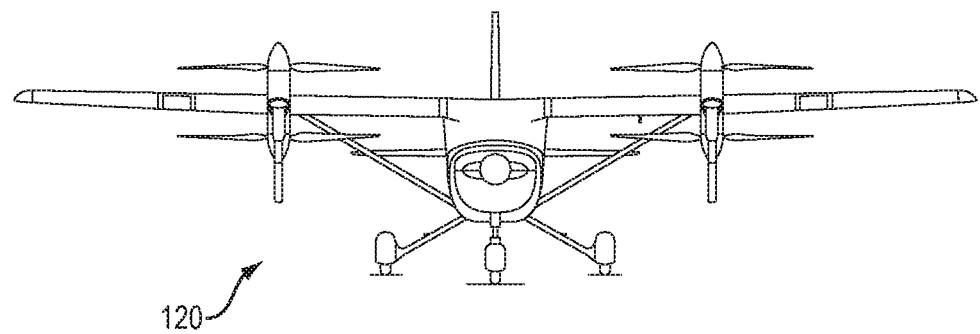
Figure 19:
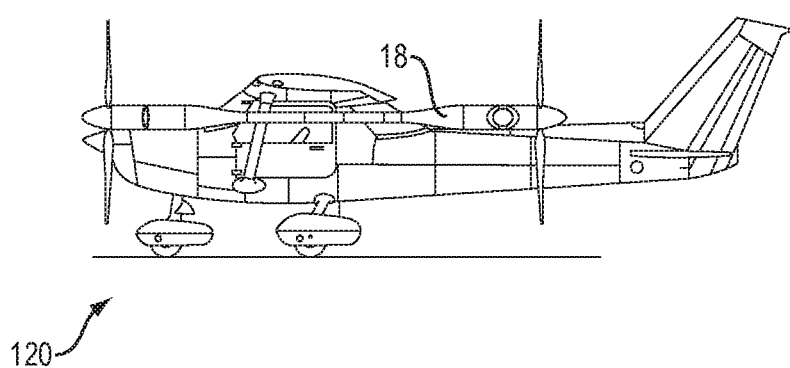
Figure 20:
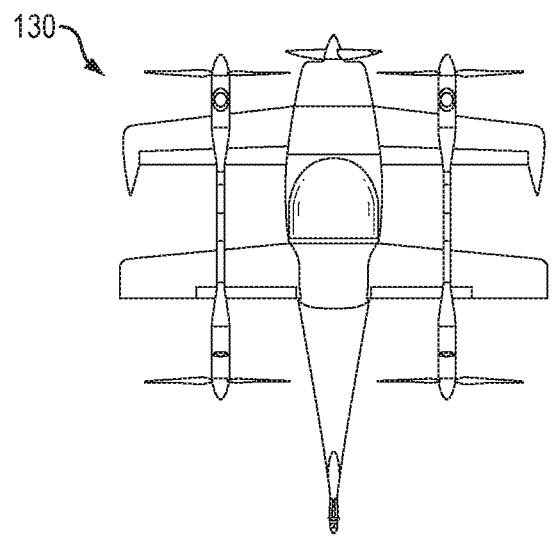
FIGS. 20-22 are top, front and side views respectively of a second aircraft of another airframe type employing the modular components.
Figure 21:
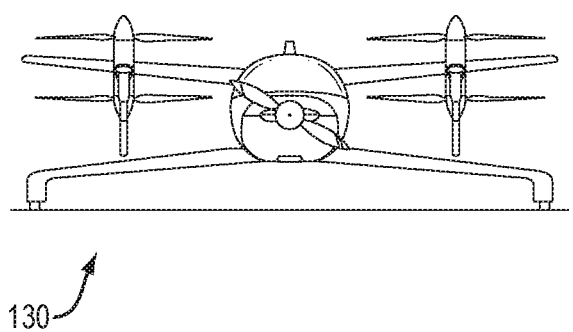
Figure 22:
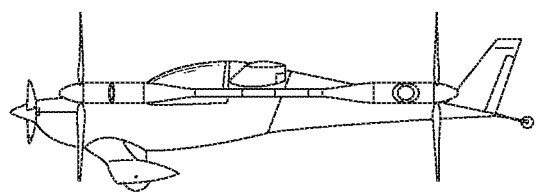

FIGS. 17-22 show examples of application to other airframe types. FIGS. 17-19 are top, front and side views of a conventional small fixed-wing airframe 120 of the type typically employing a single combustion engine, configured with rotors 16 and booms 18 attached to the undersides of the wings similar to the aircraft 10. FIGS. 20-22 are top, front and side views of a second type of fixed-wing aircraft 130 similarly configured with boom-mounted rotors 16.

FIGS. 23-24 illustrate ranges of articulation (swept-arc shape) and example articulation angles (dashed line) of the rotors 16. In this example, FIG. 23 illustrates articulation about a generally vertical (yaw) axis, while FIG. 24 illustrates articulation about a generally horizontal (tilt) axis.

For the symmetric arrangement of FIG. 26, all propulsion pods have equivalent ranges of motion and are used during all phases of flight. However, the system can operate with just a pair/set of propulsion systems operating to provide all flight control—with the remainder operating with limited or no thrust vectoring capabilities. In an embodiment having four rotors, this can be accomplished with either the forward pair of rotors or the rear pair of rotors. There may be a preference for the forward pair of rotors for fixed wing flight to achieve the most efficient propeller state during cruise; the rear motors can therefore be stowed in a defined position and rendered in active during fixed wing phases of flight yielding increased system electrical efficiency and reduced acoustic signature. The rear/aft rotors can then be reactive during fixed wing flight for greater dash speed or climb capability and to enter transition to VTOL for recovery at the conclusion of the flight. Moreover, this asymmetric control capability enables the system to employ rotor pair/set with restricted ranges of motion or with no tilting/yaw thrust vectoring capabilities to reduce weight and complexity of installed propulsion systems. For embodiments with more than 4 propulsion pods, the designation of alternative/restricted articulation capability can be applied between forward and aft propulsion systems so that a forward and rear set could have a mix of constrained/fixed propulsion pods and fully capable articulation capabilities. Selection of these alternative control modalities can be made by swapping and interchanging propulsion modules on the aircraft.

FIGS. 29-31 illustrate differences of flight control and dynamics among the three configurations of FIGS. 26-28 respectively. That is, FIG. 29 shows operation for an aircraft having the symmetric configuration of FIG. 26; FIG. 30 shows operation for an aircraft having the constrained configuration of FIG. 27; and FIG. 31 shows operation for an aircraft having the constrained fixed configuration of FIG. 28. All may realize a steep takeoff, but vary in the nature of their transition to forward flight, ranging from rapid transition (FIG. 29, for the symmetric configuration of FIG. 26) to mild transition (FIG. 30, for the constrained configuration of FIG. 27) to shallow transition (FIG. 31, for the fixed configuration of FIG. 28.

Figure 32:
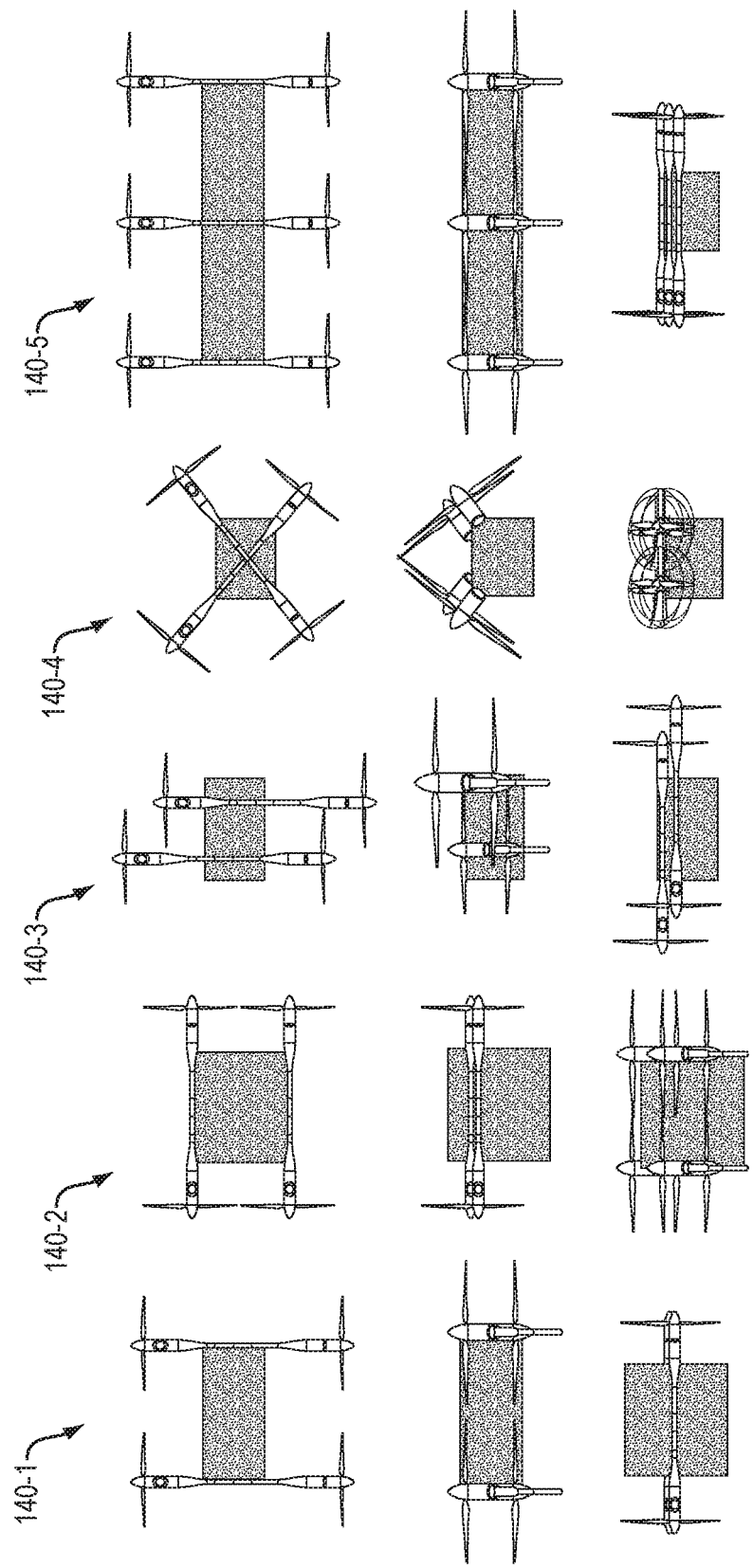
FIG. 32 is a quasi-schematic depiction of different propulsion pod geometries.

FIG. 32 is a quasi-schematic depiction of different propulsion pod geometries (configurations of boom-mounted rotors) that may be used. Five configurations 140-1 through 140-5 are shown. For each configuration 140, three views are shown: top, front and side (proceeding downward in FIG. 32). The different implementations of propulsion pod placement and attachment to the aircraft body include variations such as offsets and lateral supports.

Figure 33:
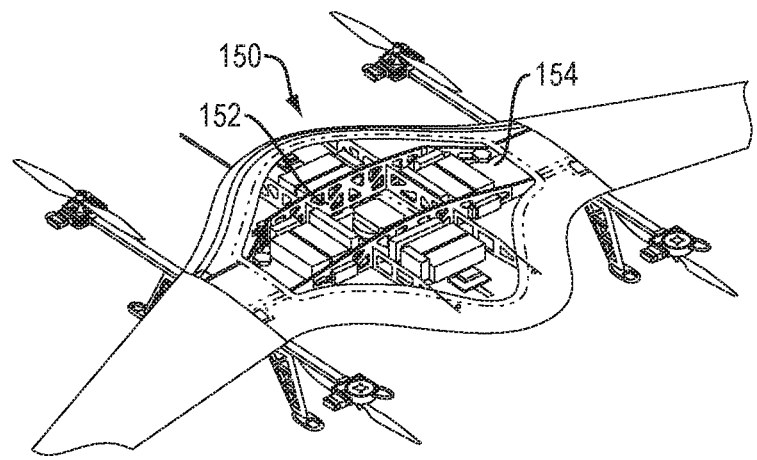
FIG. 33 is a view of an aircraft with exposed payload/battery compartment.
Figure 34:
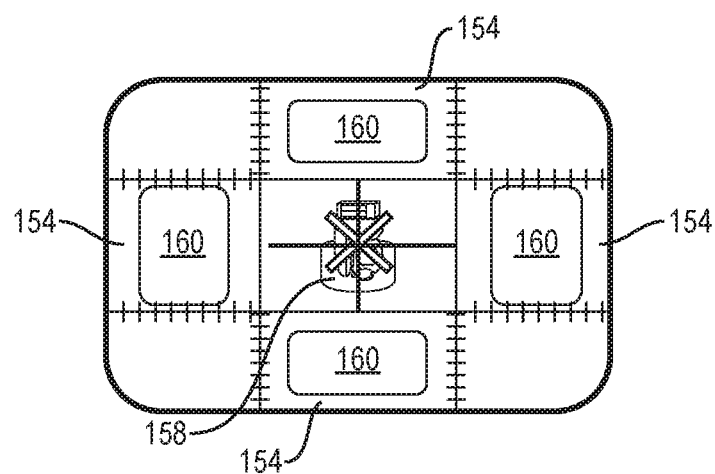
FIGS. 34-35 are schematic depictions of arrangements of payload and battery sections of the payload/battery compartment.
Figure 35:
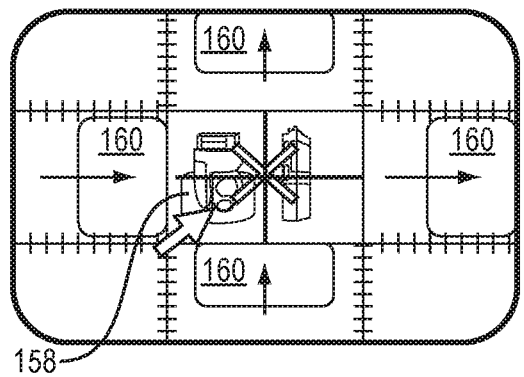

FIGS. 33-35 illustrate aspects of battery placement and dynamic positioning for managing the center of gravity of the aircraft. FIG. 33 shows the aircraft 10 having a compartment 150 within the central body 12. This compartment is divided into a central payload compartment 152 and four surrounding battery compartments 154. This internal layout includes variable battery installation stations that provide flexibility to manage the center of gravity (CG) of the aircraft in a deliberate and controlled manner without modification of the aircraft or other supporting systems. This is depicted in FIGS. 34 and 35. FIG. 34 shows a condition in which a payload 158 is CG-aligned and thus the batteries 160 are arranged symmetrically. FIG. 35 shows a different situation in which the payload 158 is not CG-aligned and thus the batteries 160 are positioned in an asymmetric manner to compensate, keeping the CG at the same centered location as in the situation of FIG. 34.

Figure 36:
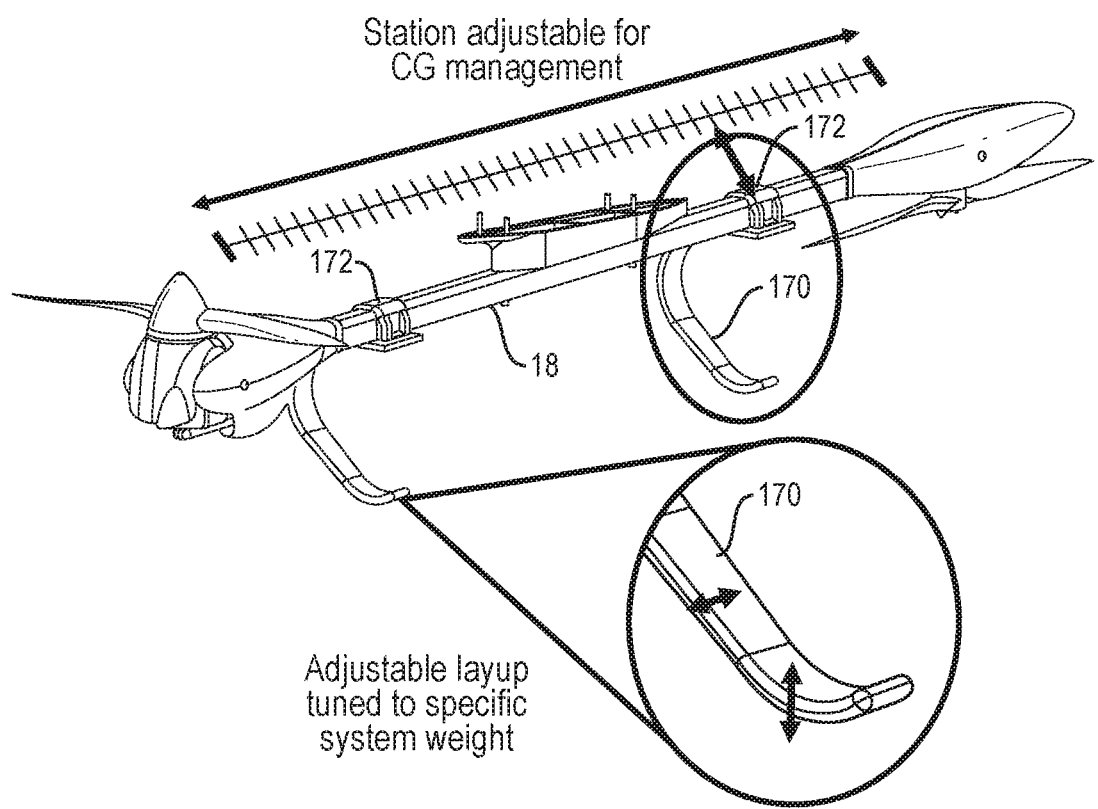
FIG. 36 is an isometric view of a boom with mounted landing gear.

FIG. 36 shows aspects landing gear design and attachment method. As shown, in one embodiment the landing gears 170 are attached to the boom 18, and their positions thereon may be station-adjustable (e.g. by use of sliding clamps 172) to achieve a desired center of gravity (CG). All landing gears 170 may be fabricated using from the same stock component and employ varying layup schedules for tuning based on the different aircraft weight and load cases. This enables the remainder of the aircraft to optimize structural mass fraction to increase payload/endurance capability while enabling for varying loadouts and configurations.

Figure 37:
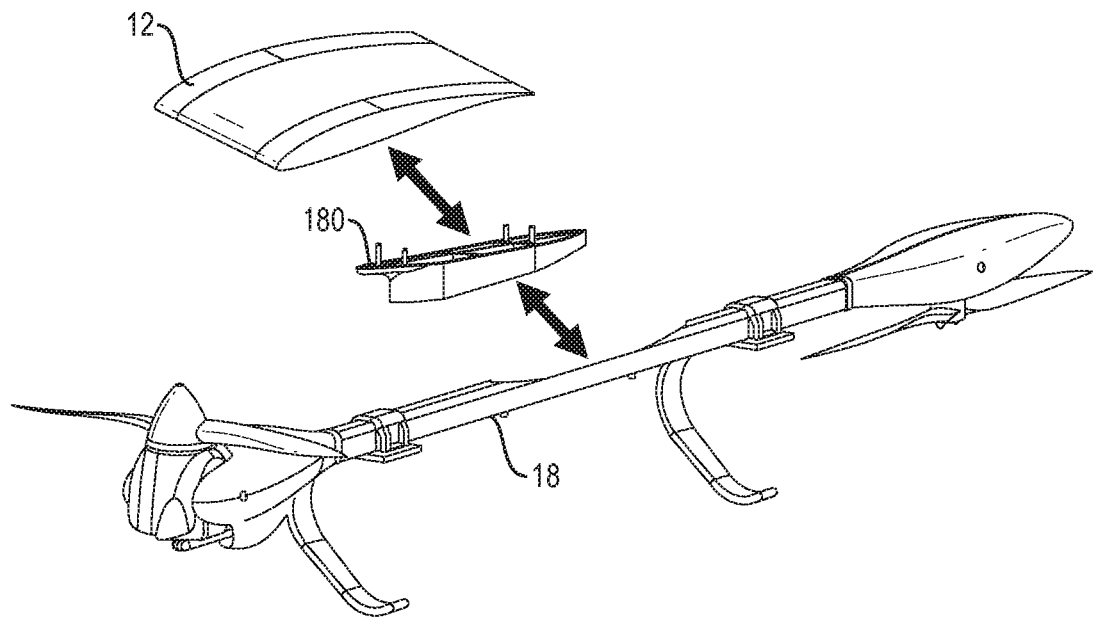
FIGS. 37-38 are isometric views illustrating modular attachment of a support boom to the aircraft.
Figure 38:
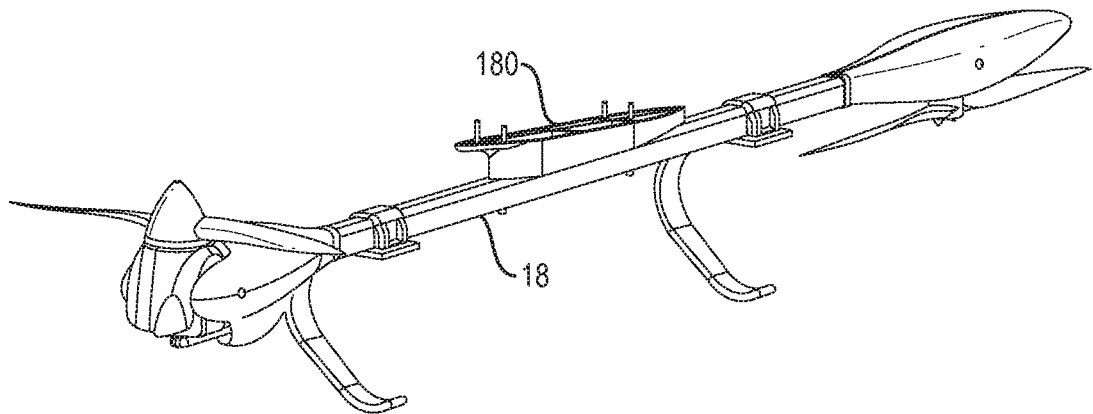

FIGS. 37-38 illustrate modular attachment of a support boom 18 to the aircraft. Each boom 18 modularly attaches to the underside lifting airframe, e.g., central body 12. An adjustable shim 180 is disposed between the bottom of the aircraft and the boom 18, enabling the propulsion system (boom-mounted rotors 16) to be aligned relative to the aircraft 10 to achieve desired thrust lines, angle-of-attack, and trim.

The following table presents additional information regarding the aircraft system.

| Feature | Discussion |
| --- | --- |
| Re-Configurable Aircraft Design - VTOL Capable fixed-wing aircraft that can operate as a multi-rotor | The disclosed system differs from known aircraft systems because it not only can transition between rotorcraft and fixed-wing flight, but also the wings can be removed, reducing form factor/wing span and facilitating operation in a hover mode while still retaining lifting body benefits (e.g., station keeping) |
| Maneuvering through independent propulsor vectors generated by unique control of each propulsor pod's relative thrust output and tilt angle | The aircraft does not utilize traditional control surfaces (ailerons, rudder, elevator, flaps) or rotorcraft control actuation (cyclic, collective pitch), instead using a single system of independently controlled propulsors providing lift, thrust, and flight control. |
| Thrust Vector Maneuverability: Tilting-hover | Vectored thrust capability enables the system to maintain aircraft pitch/elevation/angle of attack in all flight regimes. This includes enabling the system to control aircraft/payload pose during hover, and mitigates body rotation required for tilting translation. It also enables increased hover efficiency, since the system can align into the wind and mitigate head-wind forces in hover by tilting pods forward. When station-keeping, free-stream air (winds aloft) may be utilized to provide assistive lift to reduce rotor hover power demands. This is a unique use case and implementation method for vectored thrust. |
| Thrust Vector Maneuverability: In-plane translation | Vectored thrust and flying wing design enable the system to translate without tilting like a traditional multi-rotor/quad-copter. Past a defined airspeed transition point, i.e., the stall speed of the airframe in forward flight, this enables the aircraft to transition to fixed-wing flight. |

| Feature | Discussion |
| --- | --- |
| Thrust Vector Maneuverability: High rate yaw | Vectored thrust enables the aircraft to overcome differential torque yaw rate limitations characteristic of multi-rotor platforms. |
| Propulsor Tandem Servo tilting mechanism design | Tandem servo implementation provides redundancy and on-axis motor rotation minimizes torque required for high rate actuation |
| Integrated (passive) flight control surfaces on the tilting pods or airframe lifting body | Enables glide and trim capability. Enables imparted forces for aircraft maneuverability to supplement or augment primary thrust vectoring |
| Integrated variable pitch rotor mechanism/system | Variable pitch rotor actuation adds an additional degree of freedom for thrust vector control and operating between VTOL and forward flight that fixed pitch propellers cannot provide. |
| Mixing algorithms | In contrast to separated lift-thrust systems, the vectored thrust solution can use mixing schemes which solve for both the force balance of the aircraft as well as desired control parameters using only the main propulsors. |
| Hover efficiency/endurance from flying wing | The flying wing configuration provides a high lift-to-drag ratio (e.g., ~20:1) compared to traditional helicopters (4:1), tilt-rotors, or multi-rotor platforms. This increased lift while operating with winds aloft reduces electrical energy required to maintain altitude or climb while in hover. The flying wing platform provides greater lift with increasing airflow, and bridges the gap between non-lifting multi-rotors and fixed-wing aircraft that do not have VTOL ($<V_{stall}$) flight capability. |

Rotor Assembly

FIGS. 39-49 describe a rotor assembly according to one or more embodiments. Generally, the rotor assembly exhibits some/all of the following characteristics:

Rotating airfoil propeller assembly

Variable airfoil/blade pitch control mechanism

Applied to a brushless direct current (BLDC) motor

Provides variable thrust control

Enables vectored thrust as part of an articulated propulsion assembly

Plurality of the modules applied to an aircraft system

Figure 39:
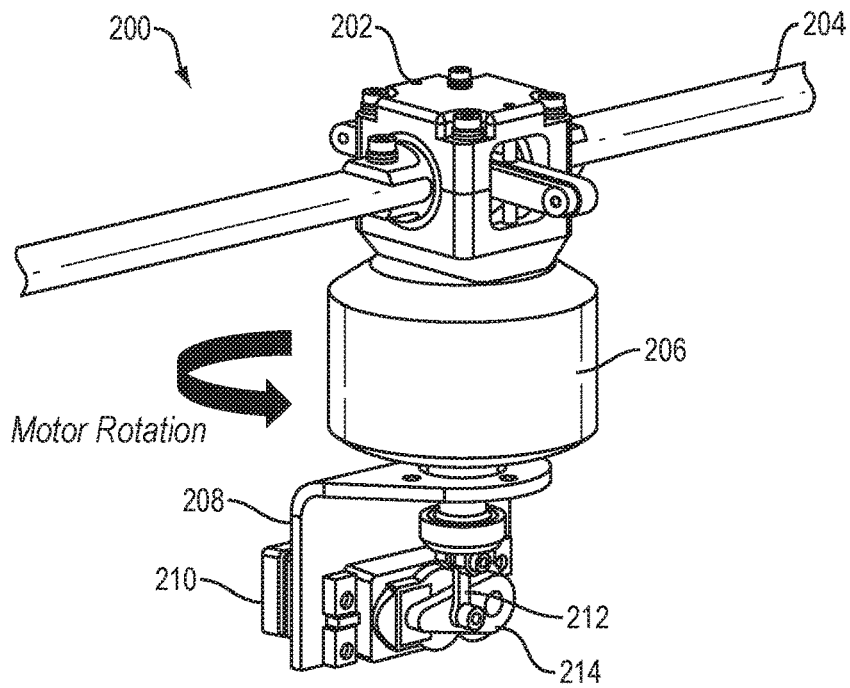
FIG. 39 is an isometric view of a first variable-pitch rotor with a neutral blade pitch.
Figure 40:
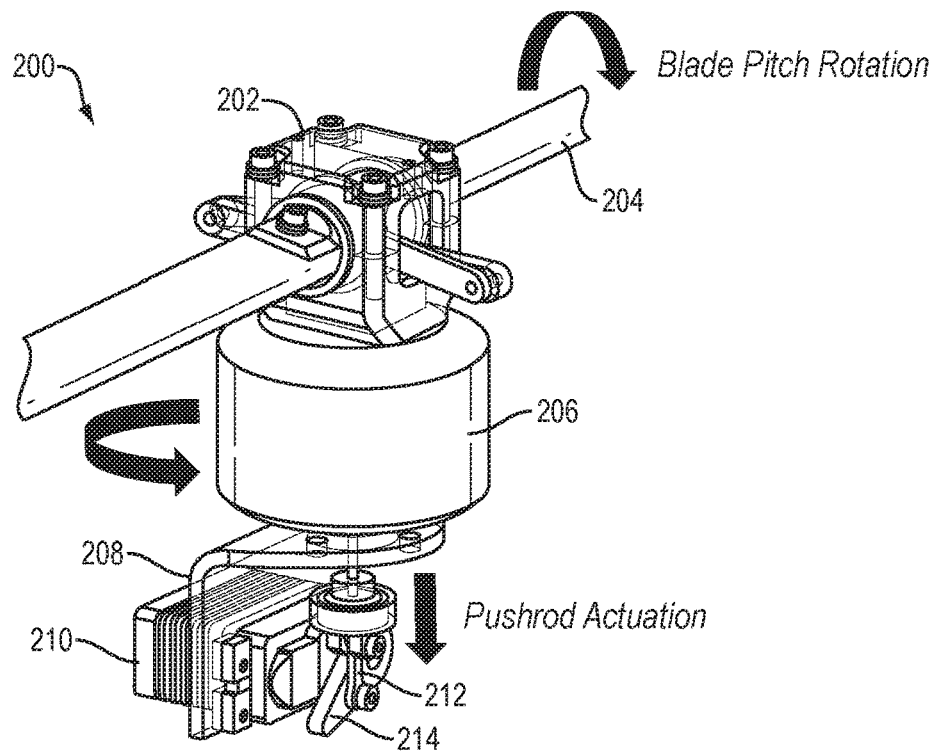
FIG. 40 is an isometric view of the first variable-pitch rotor with a negative blade pitch.
Figure 41:
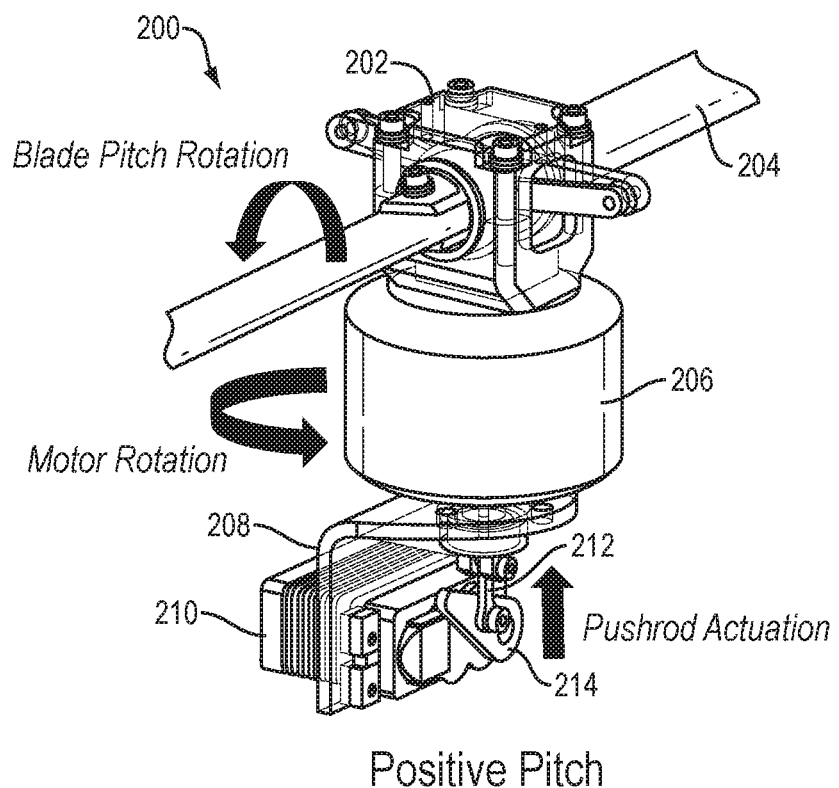
FIG. 41 is an isometric view of the first variable-pitch rotor with a positive blade pitch.

System level flight control methodology to manage independent thrust vectors to achieve overall aircraft resultant maneuver Operates on a system that transitions between VTOL and fixed wing flight FIGS. 39-43 illustrate a first embodiment of a rotor assembly 200 with blade pitch adjustment. FIG. 39 illustrates a neutral blade pitch position, midway between a fully positive pitch and a fully negative pitch. FIG. 40 illustrates pitch in a first rotational direction, which is identified as "negative" pitch. FIG. 41 shows pitch in the opposite rotational direction, identified as "positive". The embodiment of FIGS. 39-43 is an example of an "outrunner" configuration of the rotor motor, in which an outer motor portion (visible in these Figures) rotates about an inner motor portion fixed to the airframe (not visible), and the push rod extends axially through the outer motor portion and does not rotate with the rotor.

The rotor assembly 200 of FIGS. 39-43 includes the following components:

202—Blade pitch mechanism (external housing visible; internal mechanism described below)

204—Blade airfoil or simply "blade"

206—Motor

208—Motor mount

210—Pitch actuation servo mechanism or "servo"

212—Pitch actuation push rod

214—Rotational interface

In operation, the pitch of the blade 204 is varied by operation of the servo 210 as commanded by a higher-level aircraft control subsystem, such as described above with reference to FIGS. 7 and 8. The servo 210 rotates the rotational interface 214 which translates the rotational motion to linear motion of the push rod 212 (vertically in FIGS. 39-42). The pitch mechanism 202 translates the linear motion of the push rod 212 into rotation of the blade 204 about its axis, thus varying the pitch or attack angle of the blade 204 with respect to the passing air stream.

Figure 42:
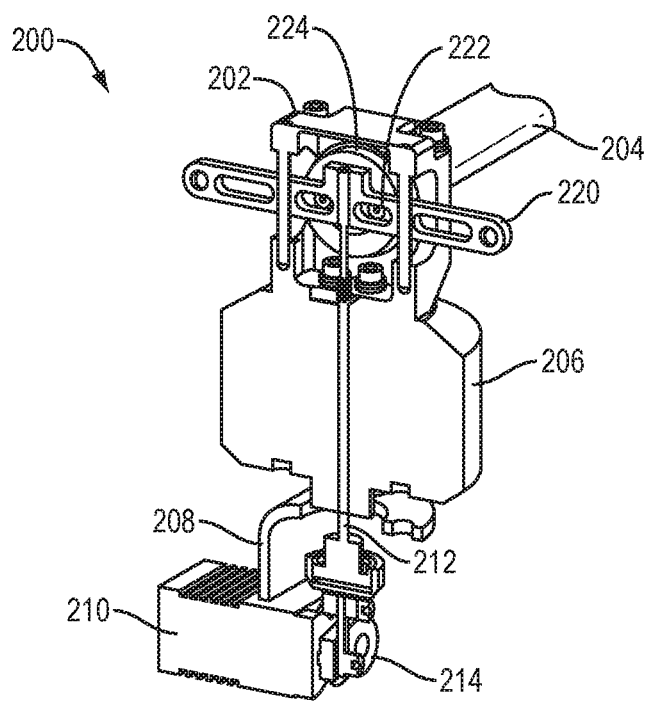
FIGS. 42 and 43 are section view of the first variable-pitch rotor.

FIG. 42 shows a simplified cross section of the rotor assembly 200, showing internals of the pitch mechanism 202. The push rod 212 is coupled to a cross arm 220 that has a follower coupling 222 to a disk-shaped flange 224 forming part of the blade 204. This mechanism converts vertical linear movement of the push rod 212 into rotation of the blade 204 by action of the follower coupling 222.

Figure 43:
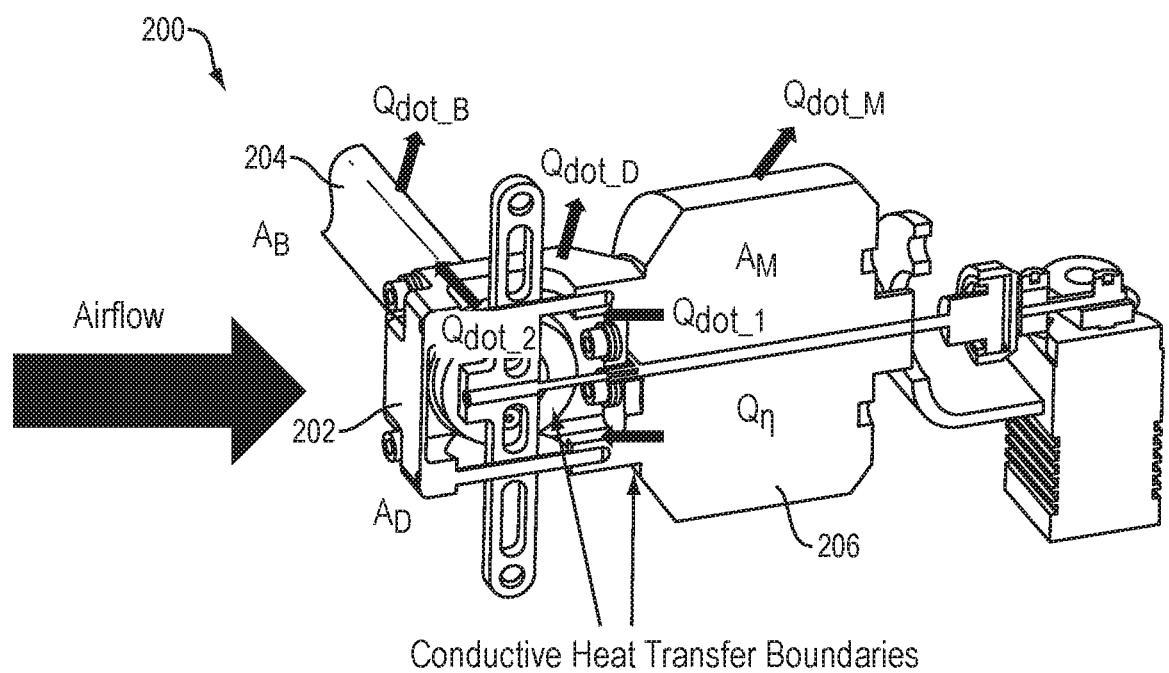

FIG. 43 illustrates a beneficial thermal aspect of the rotor assembly 200 as occurs during operation due to its structure. Heat generated by the motor 206 is dissipated in two ways. One, shown as $Q_{dot\_M}$, is heat flow radially outward to the passing airstream. A second way, shown as $Q_{dot\_1}$, is conductive flow into the variable pitch mechanism 202, which is directly cooled (head-on) by the oncoming airstream, and thus functions as a heat sink. Heat is carried away from the variable pitch mechanism 202 in two ways, shown as $Q_{dot\_D}$ (radially outward) and by conduction $Q_{dot\_2}$ into the blades 204, which release the heat as $Q_{dot\_B}$ by convection into the passing airstream.

Figure 44:
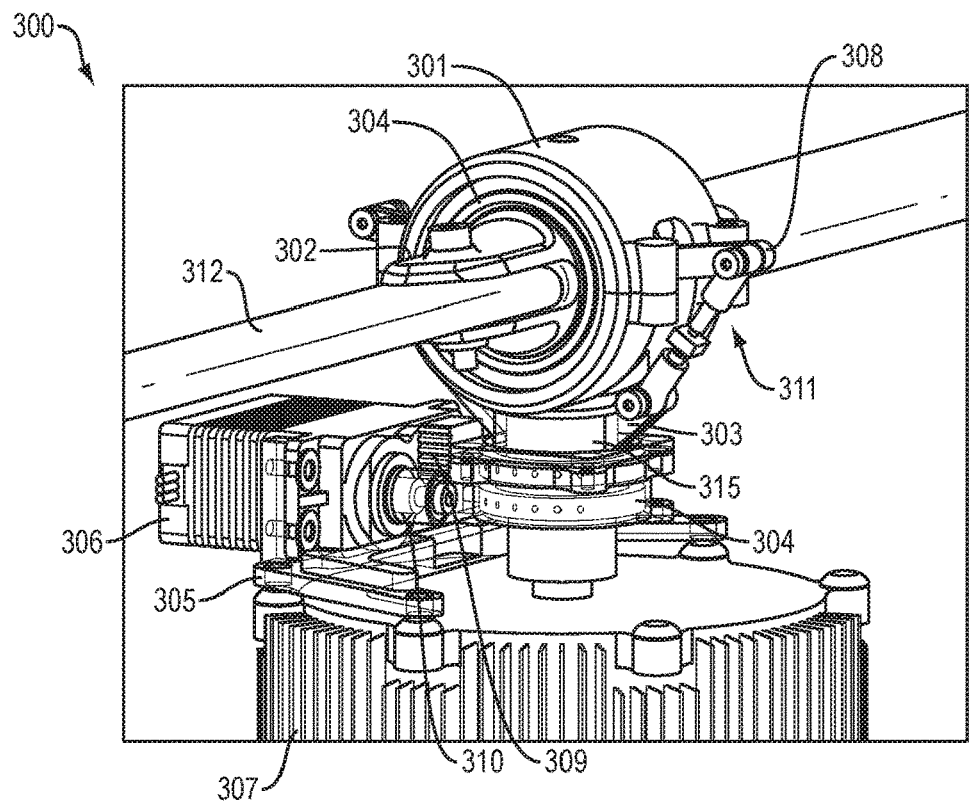
FIG. 44 is an isometric view of a second variable-pitch rotor with a first blade pitch.
Figure 45:
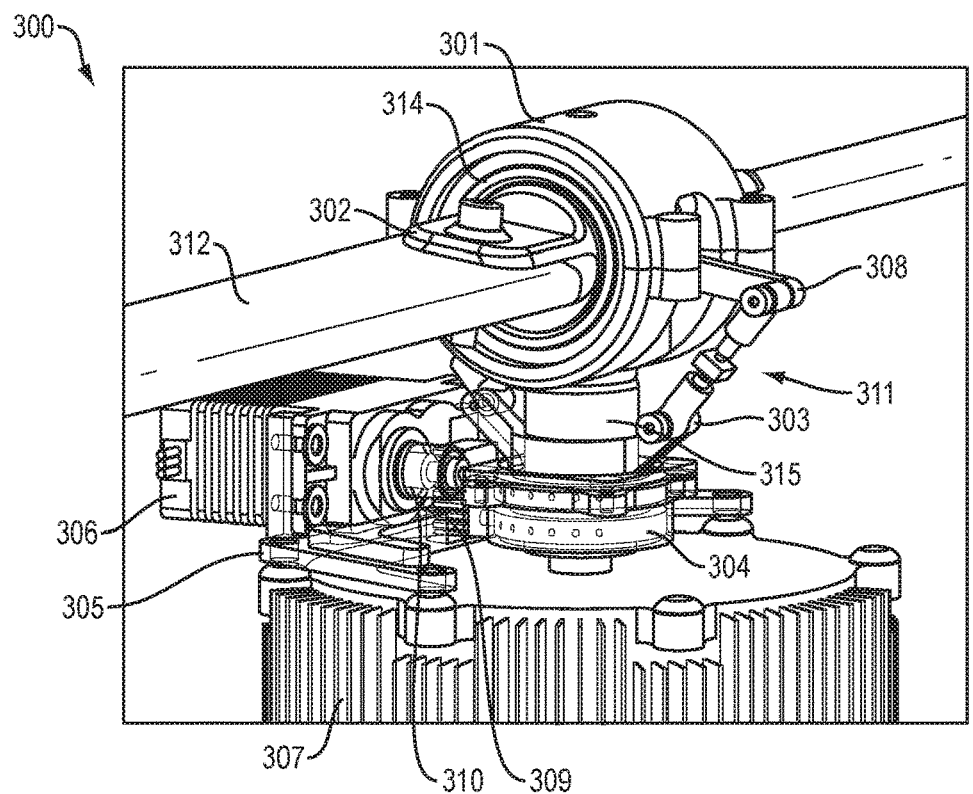
FIG. 45 is an isometric view of the second variable-pitch rotor with a second blade pitch.
Figure 46:
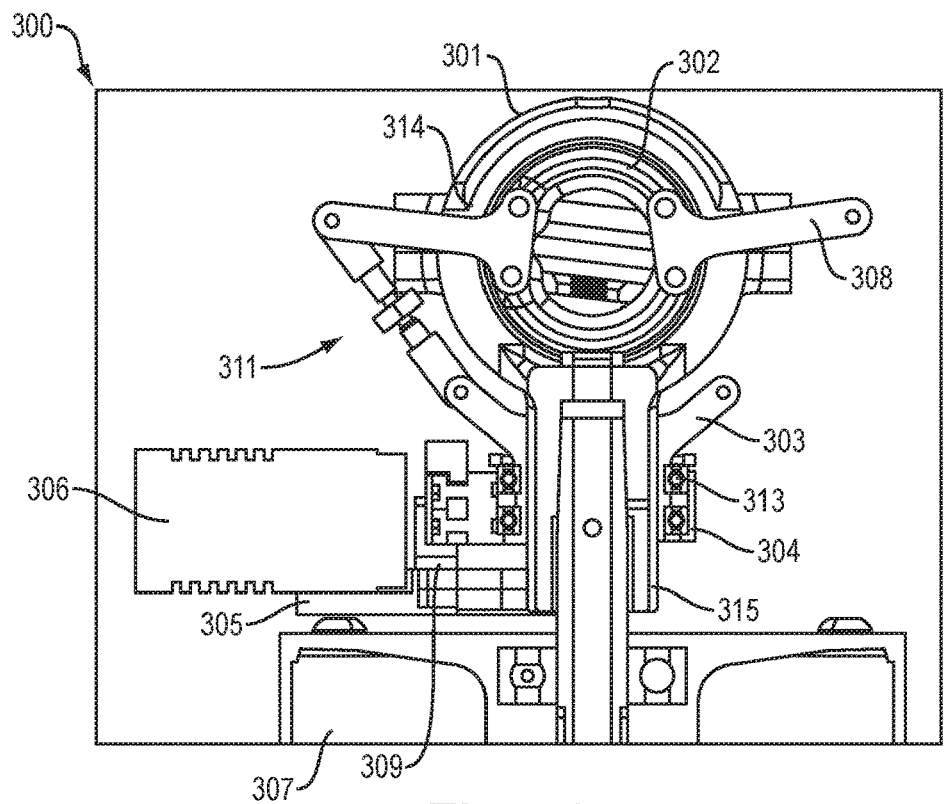
FIG. 46 is a section view of the second variable-pitch rotor.
Figure 47:
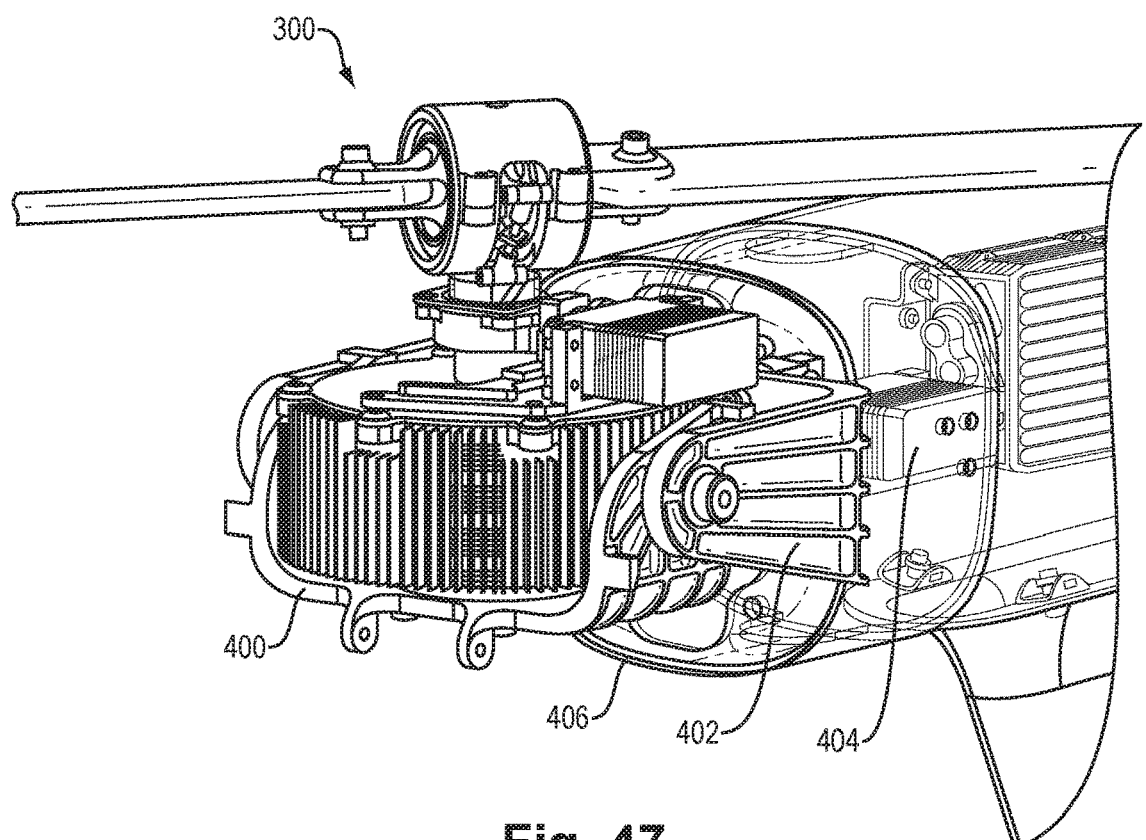
FIG. 47 is an isometric view of a portion of an aircraft with the second variable-pitch rotor assembly in VTOL configuration.
Figure 48:
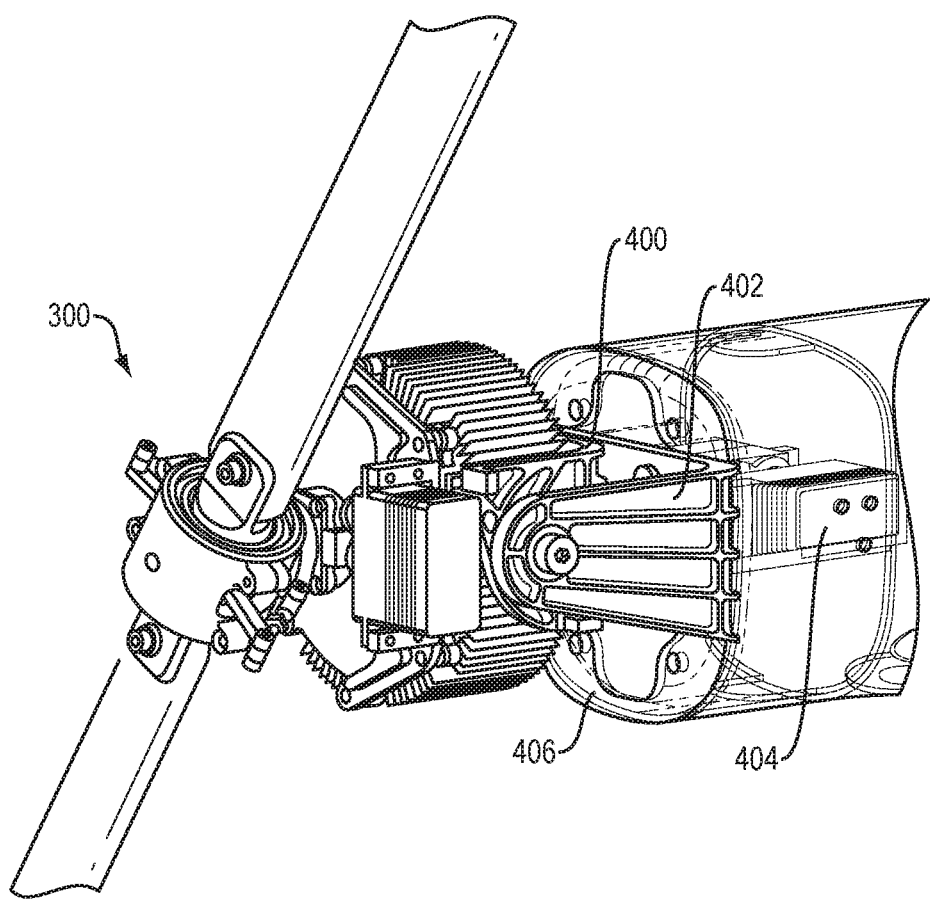
FIG. 48 is an isometric view of a portion of an aircraft with the second variable-pitch rotor assembly in forward flight configuration.

FIGS. 44-48 illustrate a second embodiment of a rotor assembly 300 with blade pitch adjustment. FIG. 44 illustrates pitch in a first rotational direction, and FIG. 45 shows pitch in the opposite rotational direction. FIG. 46 is a cross section view. FIG. 47 shows the rotor assembly 300 configured vertically during use, (e.g., for vertical takeoff or landing (VTOL)), and FIG. 48 shows the rotor assembly 300 configured horizontally during use, for forward flight. The rotor assembly 300 is an example of an "inrunner" configuration of the rotor motor, in which the rotor blade 312 is driven for rotation by an extended central shaft of a rotor motor that is fixed to the airframe, employing a bushing 315 that provides for linear movement of a yoke 303 decoupled from rotation of the rotor blade 312.

As shown in these Figures, the rotor assembly 300 includes the following components:

| 301 | Split Housing |
| 302 | Blade Coupler |
| 303 | Linkage Yoke |
| 304 | Linear Bearing Housing (houses yoke bearings 313, see FIG. 46) |
| 305 | Servo Bracket |
| 306 | Servo |
| 307 | Drive Motor |
| 308 | Blade Coupler Arm |
| 309 | Gear Rack |
| 310 | Pinion Gear |
| 311 | Adjustable Linkage |
| 312 | Propeller Blade |
| 313 | Yoke Bearings (within bearing housing 304; see FIG. 46) |
| 314 | Blade Bearing |
| 315 | Linear Bushing |

In operation, the servo motor 306 rotates the pinion 310 in response to commanded input from the higher level aircraft control subsystem, such as described above with reference to FIGS. 7 and 8, and this rotation is translated to vertical linear motion of the yoke 303 and bearing housing 304 (sliding on bushing 315) by the rack 309 engaged by the pinion 310. Vertical motion of the yoke 303 causes rotation of the blade coupler arm 308 via the linkage 311, which results in corresponding pitch rotation of the blade 312.

As shown in FIGS. 47-48, the rotor assembly 300 is mounted to an aircraft by a yoke arrangement including an inner U-shaped member ("cup") 400 which is rotatably coupled to an outer U-shaped member ("yoke") 402 that is rigidly attached to the airframe. The cup 400 swivels with respect to the yoke 402 to attain different orientation for different modes of operation. FIG. 47 shows the VTOL configuration, in which the cup 400 and rot assembly 300 are rotated 90 degrees with respect to the yoke 402. FIG. 48 shows the forward-flight arrangement in which the cup 400 and rotor assembly 300 are rotated 0 degrees with respect to the yoke 402. The rotation of the cup 400 is caused by an actuator 404 and associated linkage (not visible) under command of the higher-level flight control subsystem. The actuator 404 is mounted within an opening of a rigid arm-like member 406 of the airframe.

Figure 49:
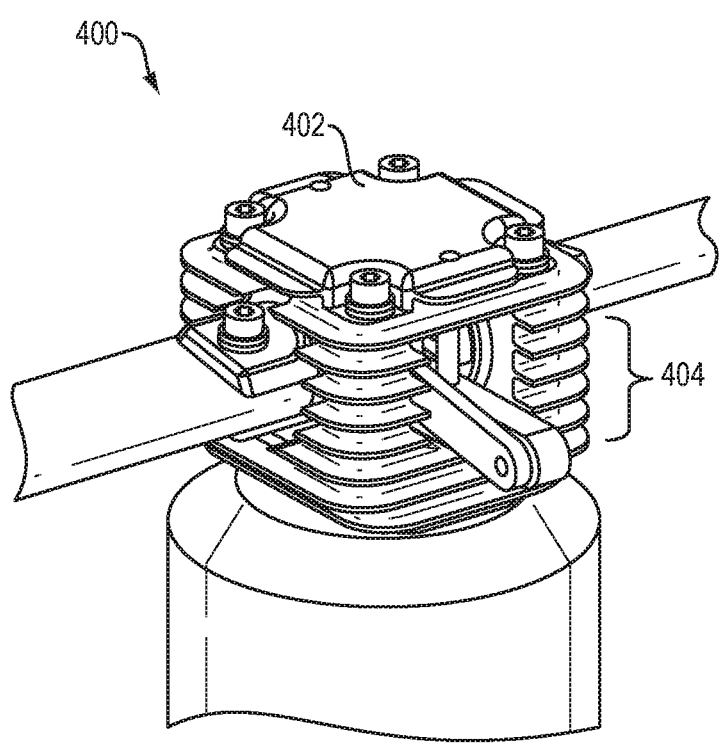
FIG. 49 is an isometric view of a variant of the first variable-pitch rotor assembly employing external cooling fins for heat dissipation.

FIG. 49 is an isometric view of an alternative variable pitch rotor assembly 400, which may be similar in almost all respects to the rotor assembly 200 described above. To further enhance heat dissipation, the pitch mechanism housing 402 is configured with cooling fins 404, increasing external surface area and thus increasing thermal coupling with the passing airstream and improving heat dissipation accordingly.

The following represent important aspects of the disclosed variable-pitch rotor arrangements:

1. Increased rotor thrust control bandwidth

This feature is distinguished from small fixed pitch rotors that provide adequate response at the small scale, but are limited in dynamic response capability to enable multi-rotor flight control as the system scale in size and inertia.

Benefit: The ability to rapidly and continuously vary the rotor pitch, and thus derived thrust, during operation as part of an aircraft control strategy, enables larger systems to achieve improved aerodynamic control accuracy, response rates, and aircraft maneuverability.

2. Tuned rotor efficiency for diverse flight regimes consistent with VTOL capable fixed wing aircraft This feature is distinguished from fixed-pitch propellers, which are challenged to perform effectively and efficiently in a diversity of operational regimes (VTOL, Transition, and Fixed Wing Flight Benefit: The ability to adjust rotor pitch to suit flight regime (VTOL, Transition, Fixed Wing Flight) enables the prop to be tuned to a defined operational point to maximize the propulsive efficiency and/or thrust effectiveness yielding increased aircraft endurance and reducing component design (mechanical, electrical, thermal) margins for edge case operational conditions resulting from a fixed pitch solution 3. Thermal transfer to rotor assembly This feature is distinguished from typical motor/rotor assemblies that rely exclusively on motor thermal management strategies. This requirement drives motor dimensional, material, airflow and features (heat sinks, air porting, blowers, etc.) requirements. Often this is addressed by making increasing the surface area of the motor, selecting high temperature materials, and leaving the motor features exposed/external to the airframe in order to leverage induced or free stream airflow while operating. All of these approaches increase the size, weight and cost of the motor.

Benefit: Increased heat rejection surface area is provided by establishing a thermally conductive interfaces between the heat source (motor) and rotor assembly. The rotor assembly is positioned such that is provides a more direct exposure to freestream/induced airflow and interfaces with the drive/motor interface such that is well/best positioned (drive shaft/bearing) to reject core heat of motor. This heat transfer enables motor design trades to reduced design margins for standalone thermal management to reduce weight, increase runtimes at peak power, and increase motor efficiency. Further, rejected heat derived from motor can be further transferred to the blades for the purpose of increasing the blade temperature as a mitigation to in-flight icing conditions 4. Constant Rotor Tip-Speed Operation This feature is distinguished from fixed pitch propeller systems that modulate thrust and/or angular momentum based on variable rotor speed. The variable speed of the rotor results in the airfoil operating with a dynamic Mach numbers which induce a dynamic acoustic signature. This variance in acoustic spectrum profile contributes to human acoustic detectability.

Benefit: The system provides the ability to drive the rotor at a constant angular velocity, resulting in a constant rotor tip speed. For thrust vectoring applications, the ability to quickly adjust prop thrust via controlled pitch enables the constant speed rotors to achieve variable thrust.

While various embodiments of the invention have been particularly shown and described, it will be understood by those skilled in the art that various changes in form and details may be made therein without departing from the spirit and scope of the invention as defined by the appended claims.

What is claimed is:

1. An aircraft, comprising:

an airframe;

a plurality of articulated electric rotors attached to the airframe, at least some of the rotors being variable-position rotors having a plurality of operating configurations and transitions between the operating configurations based on rotor position signals, the rotors generating respective magnitudes and directions of vectored thrust in respective operating configurations as the result of the coordinated actuation of one or more degrees-of-freedom relative to the aircraft, the variable-position rotors being further configured for variable pitch of respective rotor blades in response to respective blade pitch signals;

a source of electrical power for powering the rotors; and control circuitry configured and operative to generate the rotor position signals and blade pitch signals to independently control rotor thrust, rotor orientation and rotor blade pitch of each of the variable-position rotors in a manner providing (i) the transitions among the operating configurations for corresponding flight modes of the aircraft, and (ii) commanded thrust-vectoring maneuvering of the aircraft in the different configurations, wherein each of the variable-position rotors includes a respective arrangement having a blade pitch actuator coupled to a variable-pitch mechanism, the variable-pitch mechanism configured and operative to translate a rotational output of the blade pitch actuator to corresponding variable-pitch rotation of the rotor blade, wherein the variable-pitch mechanism includes a rotational interface, push rod and cross arm, the rotational interface translating between the rotational output of the blade pitch actuator and corresponding linear movement of the push rod, the cross arm being coupled between the push rod and a flange of the rotor blade to translate the linear movement of the push rod to the variable-pitch rotation of the rotor blade, and wherein the variable-position rotors have an outrunner configuration in which an outer motor portion rotates about an inner motor portion fixed to the airframe, and the push rod extends axially through the outer motor portion and does not rotate with the rotor.

2. The aircraft of claim 1, wherein the variable-pitch mechanism further includes a housing directly coupled to the outer motor portion to function as a heat sink for heat generated by the motor in operation, the housing facing an oncoming airstream to provide for dissipation of the generated heat.

3. The aircraft of claim 2, wherein the housing has external cooling fins providing increased surface area of the dissipation of the generated heat.

4. The aircraft of claim 1, wherein the rotors include front rotors located forward of a center of the aircraft and rear rotors located rearward of the center of the aircraft, the front rotors having either an upward or downward orientation and the rear rotors having an opposite orientation to the orientation of the front rotors.

5. The aircraft of claim 4, wherein the rotors having upward orientation are configured to provide tractor propulsion and the rotors having downward orientation are configured to provide pusher propulsion.

6. The aircraft of claim 1, wherein the rotors include front rotors located forward of a center of the aircraft and rear rotors located rearward of the center of the aircraft, the front rotors having either an upward or downward orientation and the rear rotors having the same orientation as the orientation of the front rotors.

7. The aircraft of claim 1 having a symmetric configuration in which front and rear rotors are the variable-position rotors and are operated (1) in a VTOL and hover mode, with the front and rear rotors positioned for vertical lift, (2) in a transition mode, with the front and rear rotors positioned for lift and transition assist, and (3) in a forward flight mode, with the front and rear rotors positioned for forward thrust.

8. The aircraft of claim 1 having an asymmetric configuration in which front rotors are full-variable-position rotors and the rear rotors are limited-variable-position rotors, and the front and rear rotors are operated (1) in a VTOL and hover mode, with the front and rear rotors positioned for vertical lift, (2) in a transition mode, with the front and rear rotors positioned for lift and transition assist, and (3) in a forward flight mode, with the front rotors positioned for forward thrust and the rear rotors being deactivated.

9. The aircraft of claim 1 having an asymmetric configuration in which front rotors are the variable-position rotors and the rear rotors are fixed-position rotors, and the front and rear rotors are operated (1) in a VTOL and hover mode, with the front rotors positioned for vertical lift along with activation of the rear rotors, (2) in a transition mode, with the front rotors positioned for lift and transition assist with activation of the rear rotors for lift assist, and (3) in a forward flight mode, with the front rotors positioned for forward thrust and the rear rotors being deactivated.

10. The aircraft of claim 1, wherein the variable-position rotors are configured for variable angular position about a tilt axis relative to a direction of motion of the aircraft.

11. The aircraft of claim 10, wherein the variable-position rotors are further configured for variable angular position about a yaw axis relative to a direction of motion of the aircraft, a combination of the variable angular positions about the tilt axis and yaw axis providing a resultant rotor orientation having respective angular components about the tilt axis and the yaw axis.

12. The aircraft of claim 1, wherein the variable-position rotors include respective servo control mechanisms for commanded positioning thereof.

13. The aircraft of claim 12, wherein the servo control mechanisms are parallel tandem servo mechanisms.

* * * * *